US006897869B1

(12) United States Patent
Bednar et al.

(10) Patent No.: US 6,897,869 B1
(45) Date of Patent: May 24, 2005

(54) SYSTEM AND METHOD FOR FILLING A POLYGON

(75) Inventors: Richard G. Bednar, Johnson City, NY (US); Donald J. Malling, Brackney, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/426,579

(22) Filed: Oct. 25, 1999

(51) Int. Cl.[7] .............................................. G06T 11/20
(52) U.S. Cl. ..................... 345/441; 345/440; 345/442; 345/443; 345/490
(58) Field of Search ................................ 345/441, 440, 345/442, 443, 467, 469.1, 490, 581

(56) References Cited

U.S. PATENT DOCUMENTS

| | | | |
|---|---|---|---|
| 3,600,513 A | | 8/1971 | Pendred et al. ............... 178/15 |
| 4,754,488 A | * | 6/1988 | Lyke ........................... 382/162 |
| 4,878,177 A | | 10/1989 | Ikenaga et al. ............. 364/489 |
| 4,897,805 A | * | 1/1990 | Wang .......................... 345/441 |
| 4,914,729 A | * | 4/1990 | Omori et al. ................ 345/418 |
| 4,969,200 A | * | 11/1990 | Manns et al. ................ 382/288 |
| 4,979,130 A | * | 12/1990 | Li et al. ...................... 345/636 |
| 5,008,830 A | | 4/1991 | Moriizumi et al. ......... 364/490 |
| 5,159,201 A | * | 10/1992 | Frei ........................ 250/492.2 |
| 5,251,140 A | * | 10/1993 | Chung et al. ............... 700/160 |
| 5,309,354 A | * | 5/1994 | Dick ........................... 700/57 |
| 5,416,893 A | * | 5/1995 | Herrell et al. ............... 345/422 |
| 5,461,703 A | * | 10/1995 | Goyins et al. ............... 358/1.9 |
| 5,463,723 A | * | 10/1995 | Saha ........................... 345/443 |
| 5,636,133 A | | 6/1997 | Chesebro et al. ........... 364/491 |
| 5,644,691 A | * | 7/1997 | Dyches et al. .............. 345/441 |
| 5,710,578 A | * | 1/1998 | Beauregard et al. ........ 345/441 |
| 6,215,501 B1 | * | 4/2001 | Takita ......................... 345/581 |
| 6,333,741 B1 | * | 12/2001 | Snead et al. ................ 345/423 |
| 6,396,036 B1 | * | 5/2002 | Hanson ....................... 219/727 |
| 6,421,052 B1 | * | 7/2002 | McGuire ..................... 345/441 |

OTHER PUBLICATIONS

G. S. Weinert, *Polygon Fill Routine for Artwork Generators*, IBM Technical Disclosure Bulletin, 09–73 p. 1351–1353.
M. R. Laff, *Algorithm for Filling a Planar Area Bounded by a Simple Closed Curve With Vertical Sided Quadrilaterals*, IBM Technical Disclosure Bulletin, 11–79 p. 2588–2591.
A. Appel, *Technique to Fill a Polygon With Rectangles*, IBM Technical Disclosure Bulletin, 7–77, p. 832–837.

* cited by examiner

*Primary Examiner*—Michael Razavi
*Assistant Examiner*—Daniel Chung
(74) *Attorney, Agent, or Firm*—Shelley M Beckstrand; William E. Schiesser

(57) ABSTRACT

The minimum number of rectangles required to fill a particular polygon and which meet input parameters including minimum stripe width, maximum stripe width, stripe overlap amount, maximum number of borders, and whether or not to merge adjacent borders, is determined by: (1) bordering, including computing a border width which is wide as possible, bordering all non-orthogonal polygons with one or more borders, merging borders when appropriate, halting bordering as soon as the interior can be efficiently filled using orthogonal fill rectangles; (2) filling, including filling the interior of the bordered non-orthogonal polygon or the unbordered orthogonal polygon with orthogonal paint stripes, filling, if possible, the uncovered area with a single least encompassing rectangle, otherwise generating orthogonal stripes using the minimum stripe width and where practical merging them with a previous adjacent stripe; and (3) processing, including locating any and all unfilled portions of the original polygon, applying steps (1) and (2) for areas which lie along the original polygon border, and applying step (2) for areas which do not lie along the original polygon border.

29 Claims, 23 Drawing Sheets

| POLYGON FILL PARAMETERS |
| --- |
| MinimumStripeWidth — 120 |
| MaximumStripeWidth — 122 |
| StripeOverlapAmount — 124 |
| Wire With Ends Size Delta — 126 |
| MaximumNumberofBorders — 128 |
| MergeAdjacentBorders Flag — 130 |

FIG. 13

SYSTEM AND METHOD FOR FILLING A POLYGON

BACKGROUND OF THE INVENTION

1. Technical Field of the Invention

This invention pertains to polygon filling. More particularly, it relates to a system and method for generating an optimum set of polygon fill rectangles for input to, for example, an artwork generator for preparing glass masters.

2. Background Art

Artwork generators are a vital part of a printed circuit board (PCB) and substrate manufacturing line. These machines are used to create the glass masters for all printed circuitry. A series of shapes are passed to the artwork generator and these are then traced onto a glass master. The glass master is then used to produce actual product.

While all artwork generators share the above similarity, they are different in many ways. One key distinguishing characteristic is whether the machine is capable of natively handling polygon shapes. If a particular artwork generator is not capable of natively handling a polygon, then it can be adapted to support these multi-sided shapes by providing separate (non-native) software to transform the polygon into a series of rectangular fill shapes. These rectangular fill shapes are also referred to as flashes or stripes or lines. This approach has been in place for years and generally exists on mainframe systems capable of performing the CPU intensive mathematics required for the analysis and fill of each polygon with a series of narrow rectangles. With complicated shapes, such as those found on a typical substrate, the volume of fill data can be enormous. This causes problems saving, loading, and manipulating these designs. Thus, there is a need in the art for a polygon fill system and method which minimizes the number of rectangles required to fill the polygon. There is also a need in the art for a workstation based polygon fill application which is a customizable application capable of accepting fill rectangle tolerances, rectangle overlap amounts, maximum number of borders, and many other parameters.

Artwork generators also are different in the manner in which a line is exposed. Some artwork machines work by opening an aperture as wide as a required line width. This aperture is then moved along the length of a line to expose the glass. Still other machines have variable size apertures which open up to expose the entire line in a single flash. There is a need in the art for a polygon fill system and method which is adaptable to the artwork generator selected for use such that all of the polygon fill rectangles conform to any and all machine limitations, thereby avoiding the need for additional data manipulation.

It is an object of the invention to provide an improved system and method for polygon fill.

It is a further object of the invention to provide a polygon fill application which is workstation based.

It is a further object of the invention to provide a workstation based polygon fill application which is capable of accepting user supplied parameters including fill rectangle tolerances, rectangle overlap amounts, and maximum number of borders so that all polygon fill rectangles conform to the selected artwork generator's machine tolerances and limitations.

It is a further object of the invention to provide a system and method for producing a minimal quantity of rectangles to fill a polygon, thereby reducing artwork generator run time.

It is a further object of the invention to provide a system and method utilizing a shapes analysis and manipulation tool to perform all required shape analysis and manipulation.

SUMMARY OF THE INVENTION

In accordance with the invention, a system and method for filling a polygon provides an optimum set of polygon fill rectangles by choosing a starting border width which is as wide as reasonably possible, merging border segments when possible, and terminating bordering and executing orthogonal fill as soon as possible.

In accordance with an aspect of the invention, there is provided a computer program product configured to be operable to define an optimal set of polygon fill rectangles.

Other features and advantages of this invention will become apparent from the following detailed description of the presently preferred embodiment of the invention, taken in conjunction with the accompanying drawings.

BRIEF DESCRIPTION OF THE DRAWINGS

FIG. 13 illustrates the polygon fill parameters input in step 110 of FIG. 12.

BEST MODE FOR CARRYING OUT THE INVENTION

There exists an almost infinite number of possible solutions for filling a particular polygon with rectangular shapes. Based upon a number of input parameters including minimum stripe with, maximum stripe width, stripe overlap amount, maximum number of borders, and whether or not to merge adjacent borders, a subset of the possible solutions can be discarded. The process for selecting from the remaining solutions that which meets the input criteria and minimizes the number of fill rectangles includes the following series of steps: (1) bordering, including computing a border width which is wide as possible, bordering all non-orthogonal polygons with one or more borders, merging borders when appropriate, halting bordering as soon as the interior can be efficiently filled using orthogonal fill rectangles; (2) filling, including filling the interior of the bordered non-orthogonal polygon or the unbordered orthogonal polygon with orthogonal paint stripes, filling, if possible, the uncovered area with a single least encompassing rectangle, otherwise generating orthogonal stripes using the minimum stripe width and where practical merging them with a previous adjacent stripe; and (3) processing, including locating any and all unfilled portions of the original polygon, applying steps (1) and (2) for areas which lie along the original polygon border, and applying step (2) for areas which do not lie along the original polygon border.

Figure 1:
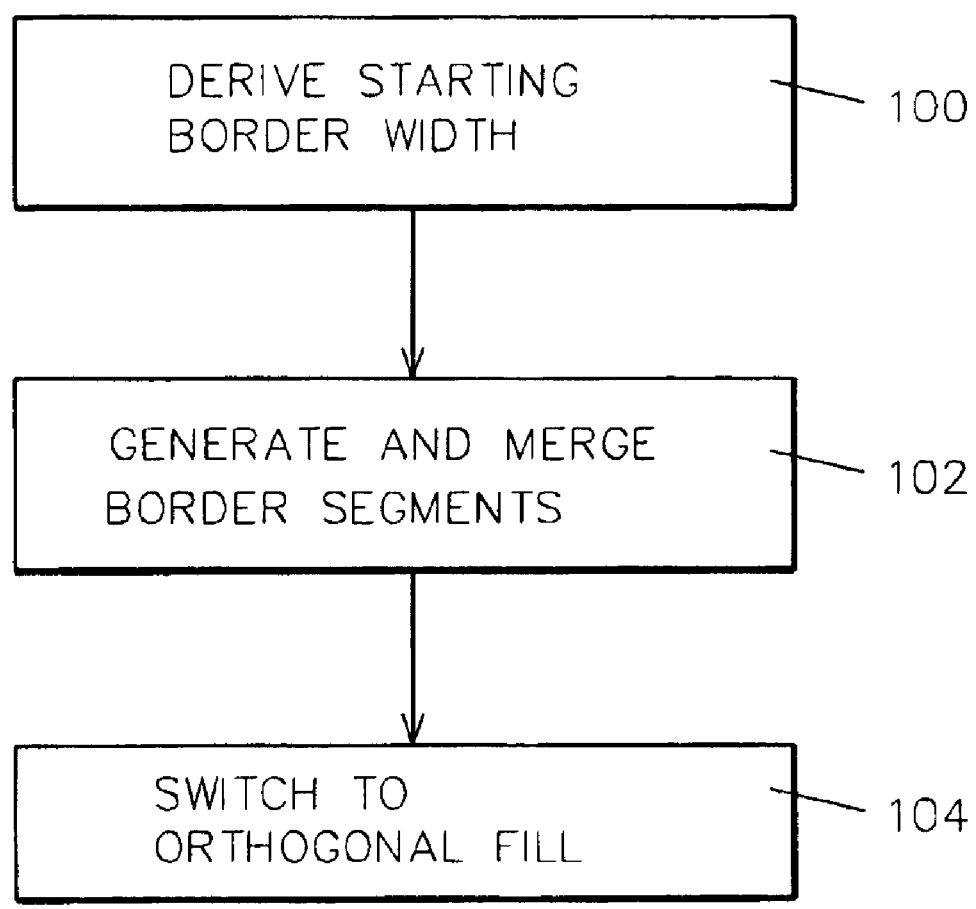
FIG. 1 is a high level flow chart of steps for minimizing the number of rectangles required to fill a polygon.

Referring to FIG. 1, in accordance with the preferred embodiment of the invention, a polygon is filled with a minimum (an optimal variation from an absolute minimum) number of lines (also referred to as fill shapes, stripes, or rectangles) as follows. In step 100, a starting border width is selected as wide as reasonably possible. In step 102, border segments are generated and then merged where possible. In step 104, bordering is terminated as soon as possible to allow orthogonal filling.

A shape analysis and manipulation tool may be used for calculating a new inner polygon, calculating a border, checking if a shape is orthogonal, computing the least encompassing rectangle (LER) for a shape, and merging non-orthogonal border segments. In the preferred embodiment of the invention, the shape analysis and manipulation tool described in U.S. Pat. Nos. 5,528,508, 5,519,628, 5,497,334 and 5,481,473 is used for etch, edgeShadow LER, coveredby, isOrthogonal, isRectangular, isInside, and difference calculations.

Referring to FIGS. 2–11, various concepts and relationships will be described which are helpful to a description of the method of the invention to be described hereafter in connection with FIGS. 12–23.

Figure 2:
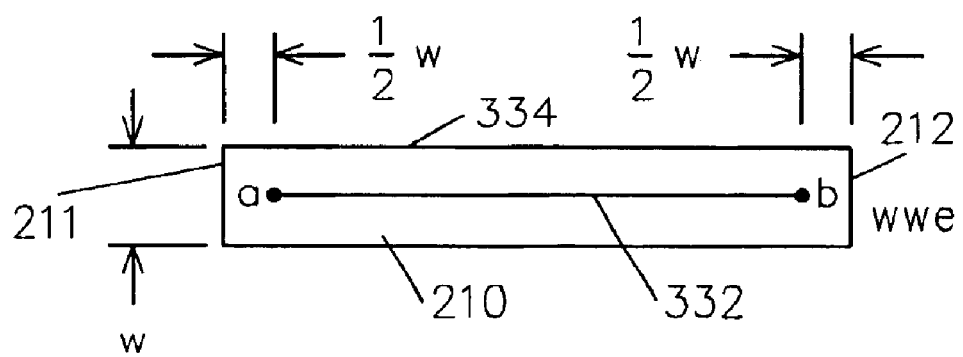
FIG. 2 illustrates a wire-with-ends (wwe)line, which is also a rectangle, used for filling a polygon.
Figure 3:
FIG. 3 illustrates a wire-with-no-ends (wne) line, which is also a rectangle, for filling a polygon.

Referring to FIGS. 2 and 3, all fill shapes are rectangular. These fill shapes are described as lines (i.e. wires) in the graphical language used to store the polygon fill output data.

In fact, the graphical language supports several types of wires, as follows:

Wires-with-ends (wwe): Referring to FIG. 2, a wire 210 graphically depicted as going from 211 to 212 would have square ends. One ending edge would touch at 211 and the other end at 212. However, the data describing the line would stop at a, short of 211 by ½ the wire width W. A similar situation exists for point b. (In other drawing figures in this application, for clarity of representation, a rectangle 210 may be referenced at its center line 332, which connects end points a and b in wires-with-ends.)

Wires-with-no-ends (wne): Referring to FIG. 3, wires-with-no-ends also have square ends. A wire graphically depicted as going from a 213 to b 214 would also be described in the data as going from a to b.

Given this background, a problem can arise when generating wires-with-ends: as the wire length begins to approach the wire width it becomes physically impossible to accurately describe a wire segment. This problem becomes catastrophic when a line's length matches its width. Two different points are required to describe a line, but when the line length is equal to the line width, the start and end points are identical and a line cannot be defined.

Figure 4:
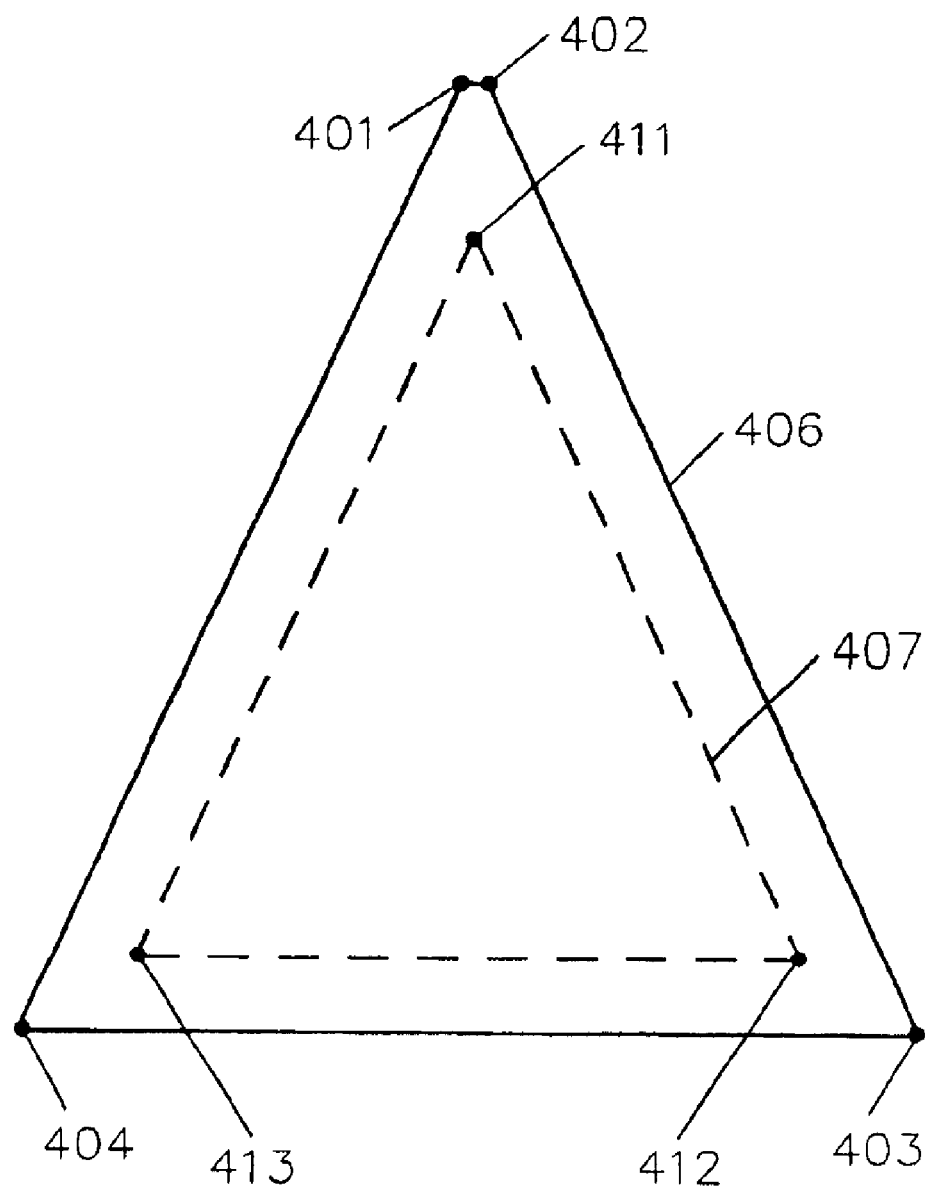
FIG. 4 illustrates a polygon shrunk into a new polygon.

Referring to FIG. 4, an original polygon 406 is illustrated, formed by vertices 401–404. Vertices 411–413 form a new polygon 407 formed by shrinking polygon 406.

Figure 5:
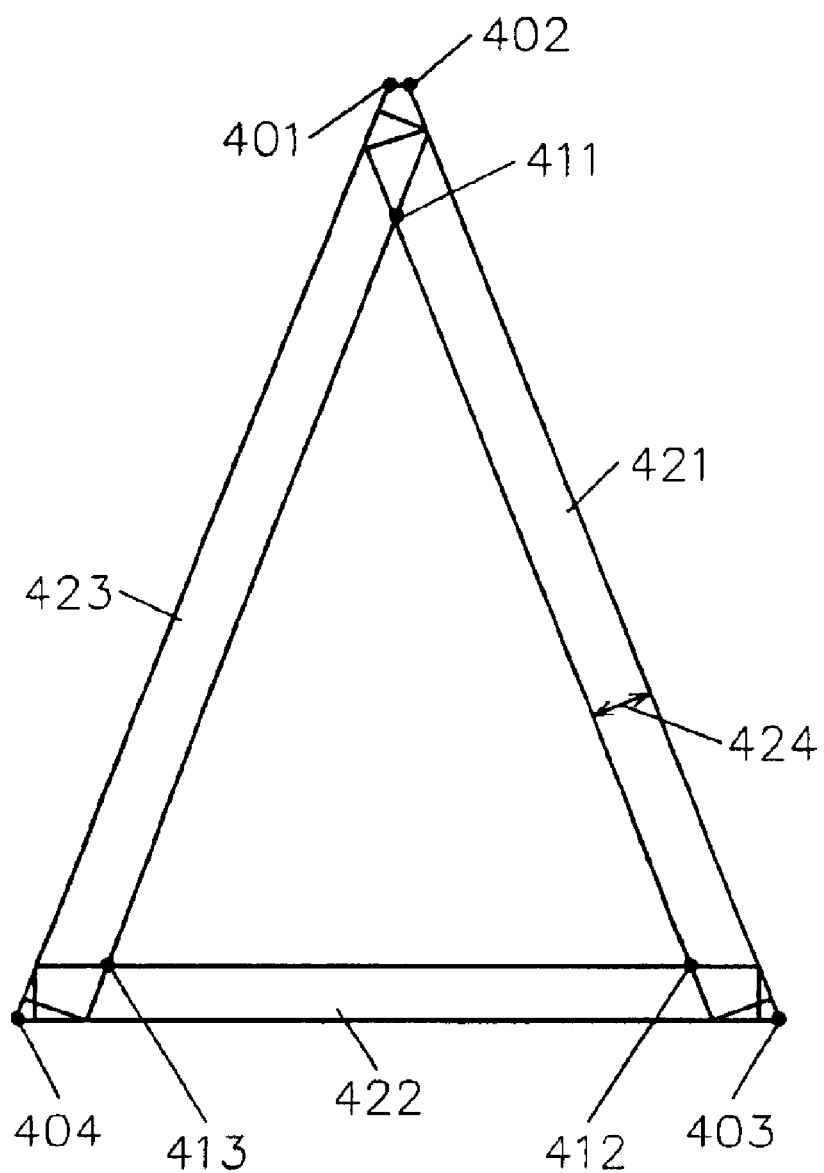
FIG. 5 illustrates the formation of border segments.

Referring to FIG. 5, border segments 421–423 of width 424 are formed using vertices 401–404 and 411–413.

Figure 6:
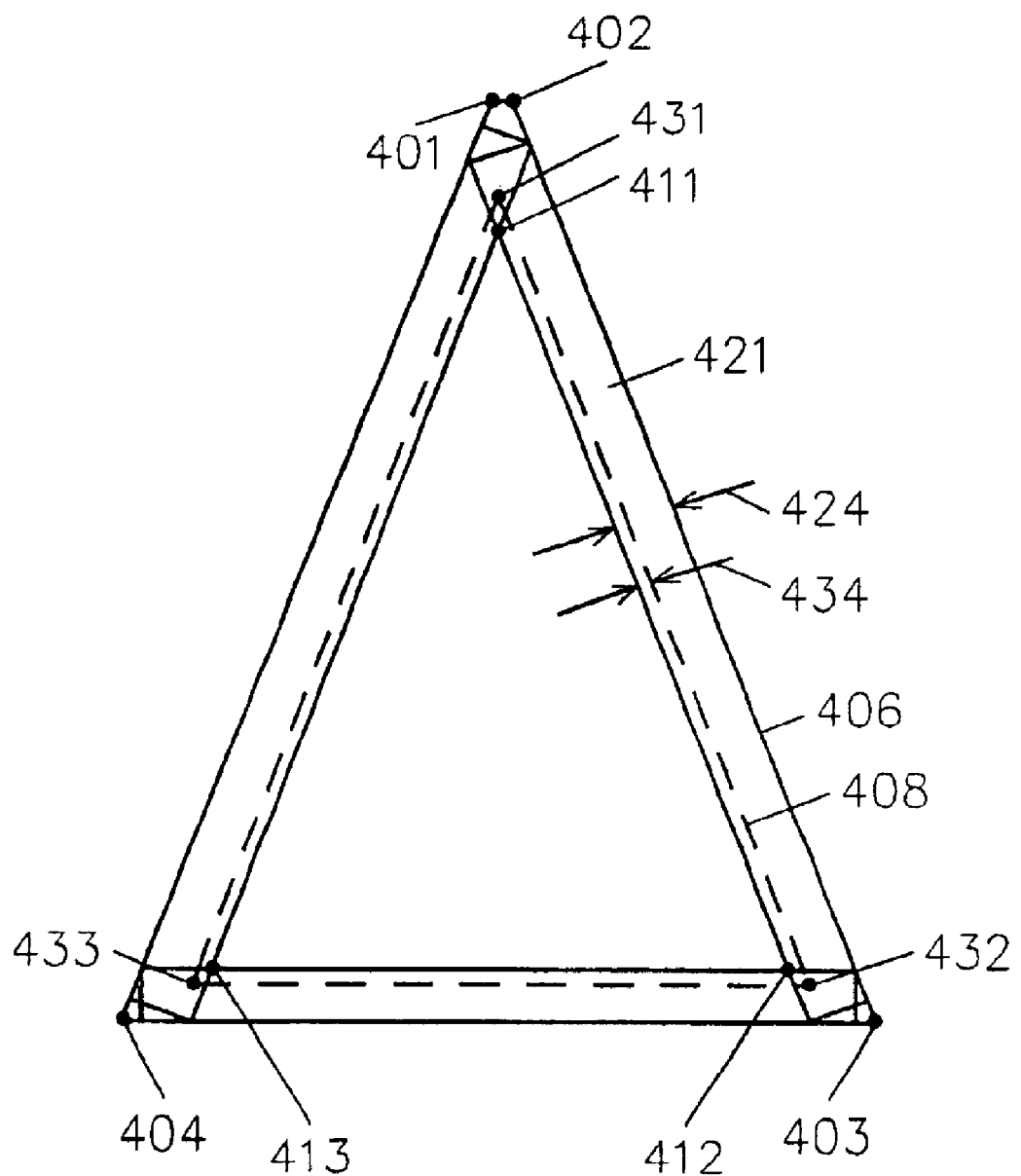
FIG. 6 illustrates the formation of a new polygon by shrinking an original polygon by a border width adjusted by stripe overlap.

Referring to FIG. 6, a new polygon 408 defined by vertices 431–433 is formed by shrinking polygon 406 by an amount equal to BorderWidth 424 less StripeOverlapAmount 434.

Figure 7:
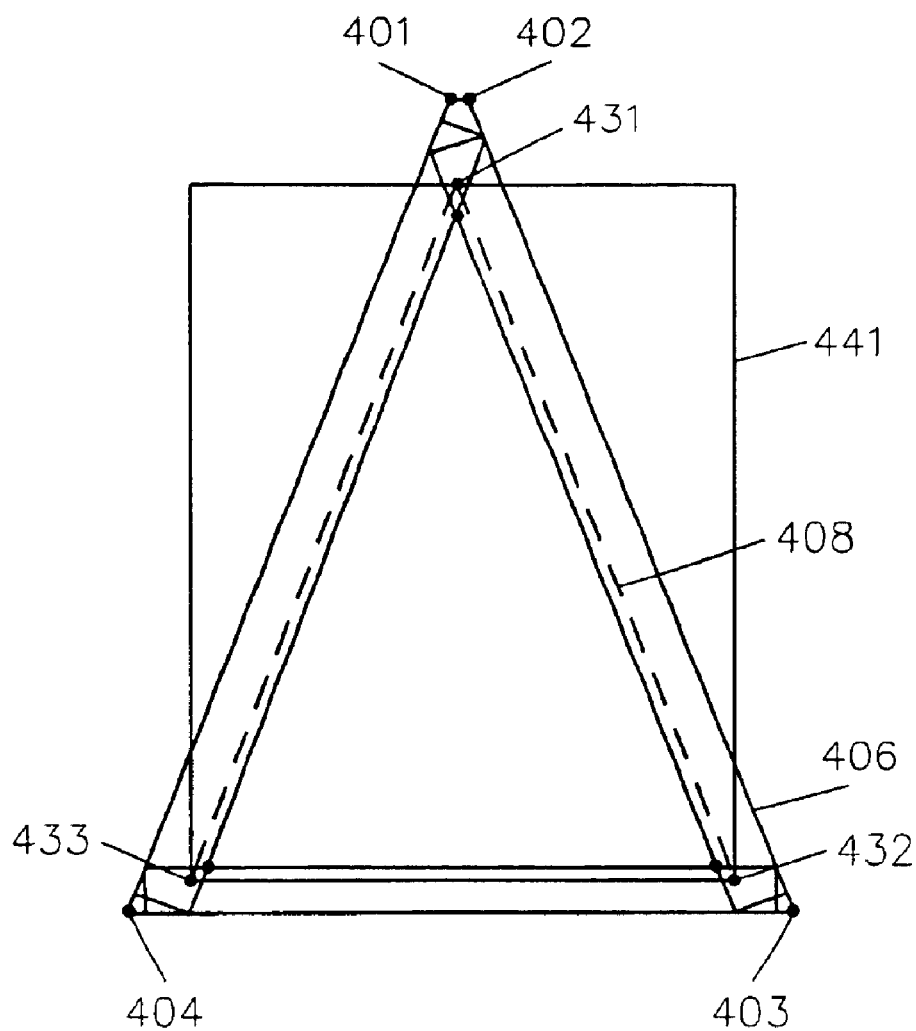
FIG. 7 illustrates a least encompassing rectangle which, because it falls outside of the original polygon, prevents switching to orthogonal fill.

Referring to FIG. 7, a least encompassing rectangle (LER) 441 for polygon 408 falls outside of original polygon 406. Under this condition, the algorithm will not switch to orthogonal fill.

Figure 8:
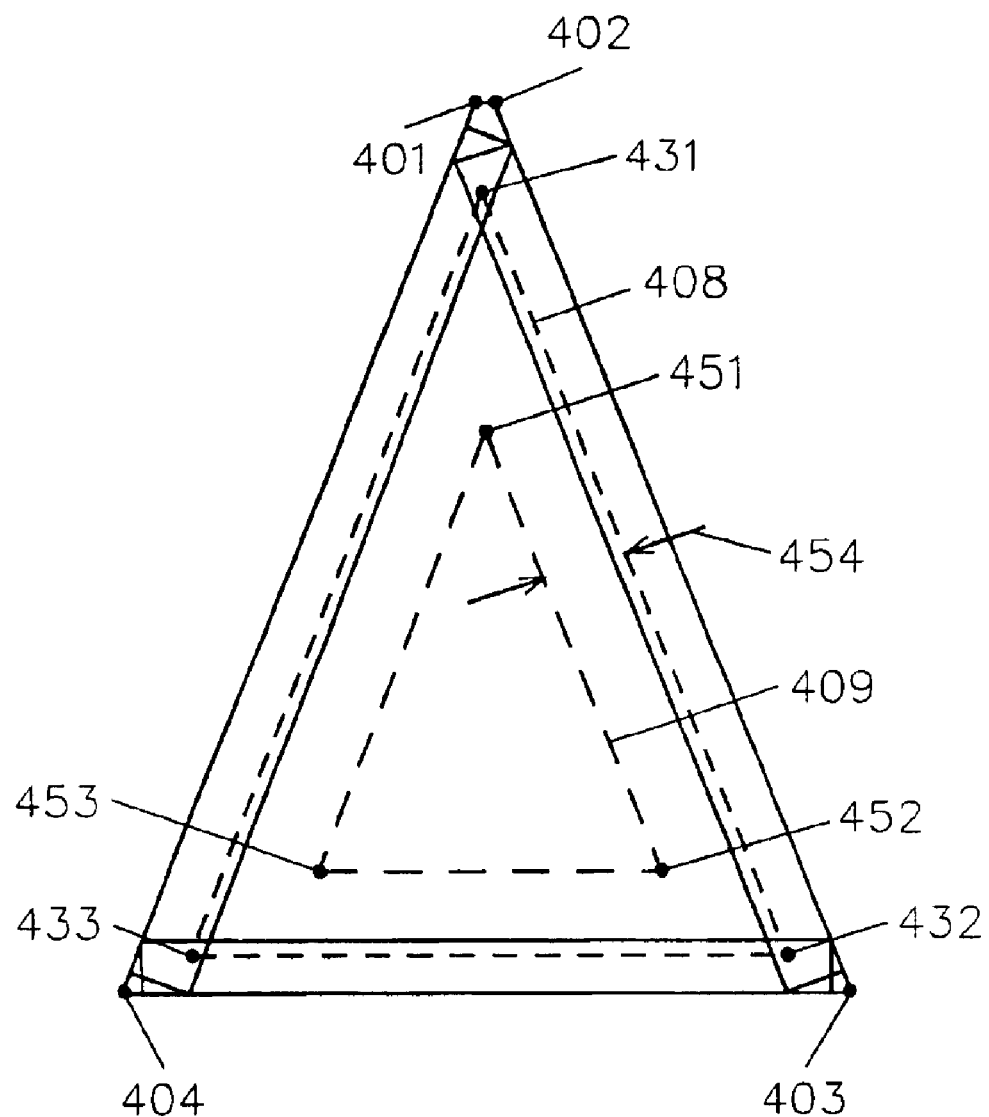
FIG. 8 illustrates a new polygon formed by shrinking the polygon illustrated in FIG. 6.

Referring to FIG. 8, polygon 409 defined by vertices 451–453 is formed by shrinking polygon 408.

Figure 9:
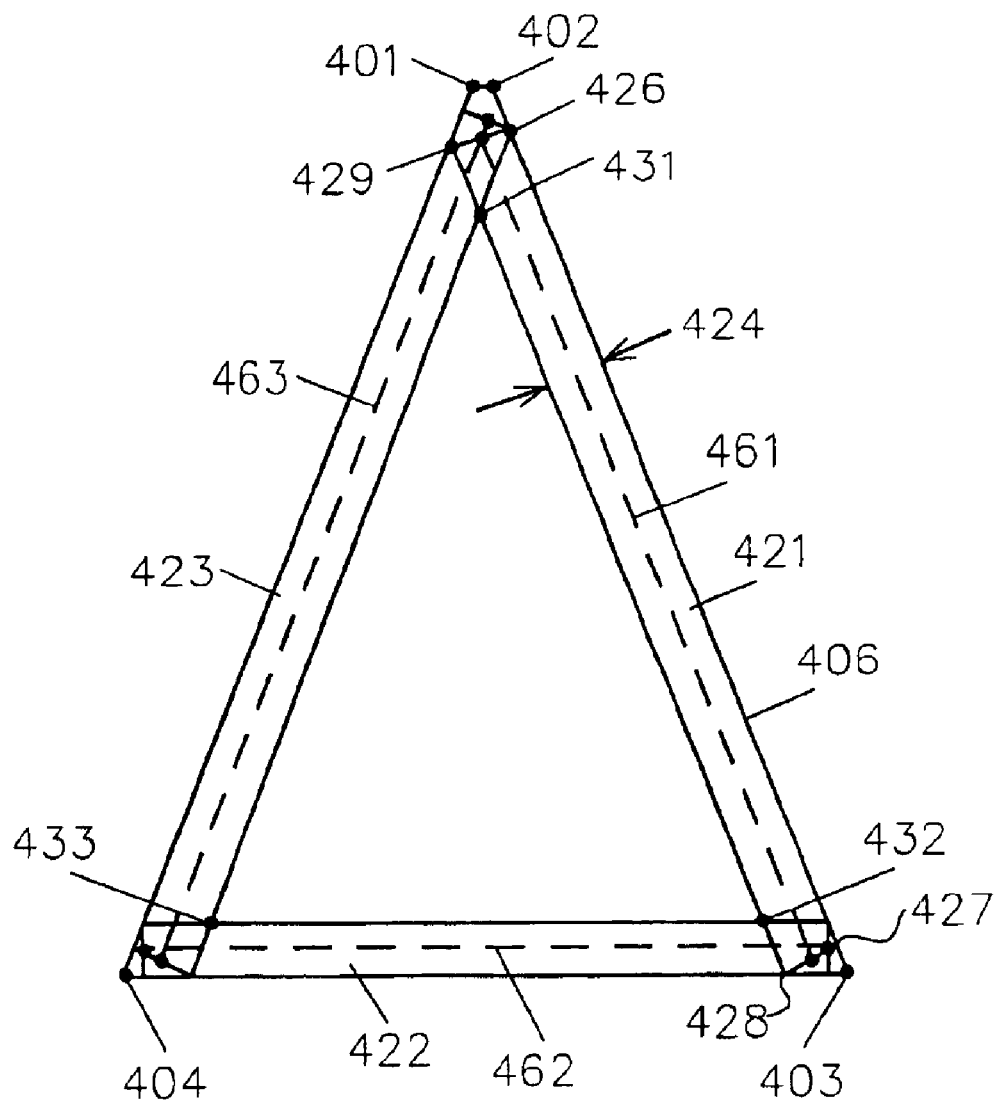
FIG. 9 illustrates the relationship of center lines of wires used to describe border segments.

Referring to FIG. 9, center lines 461–463 of wires used to describe border segments 421–423 are created by shrinking polygon 406 defined by vertices 401–404 by border width 424 divided by two.

Figure 10:
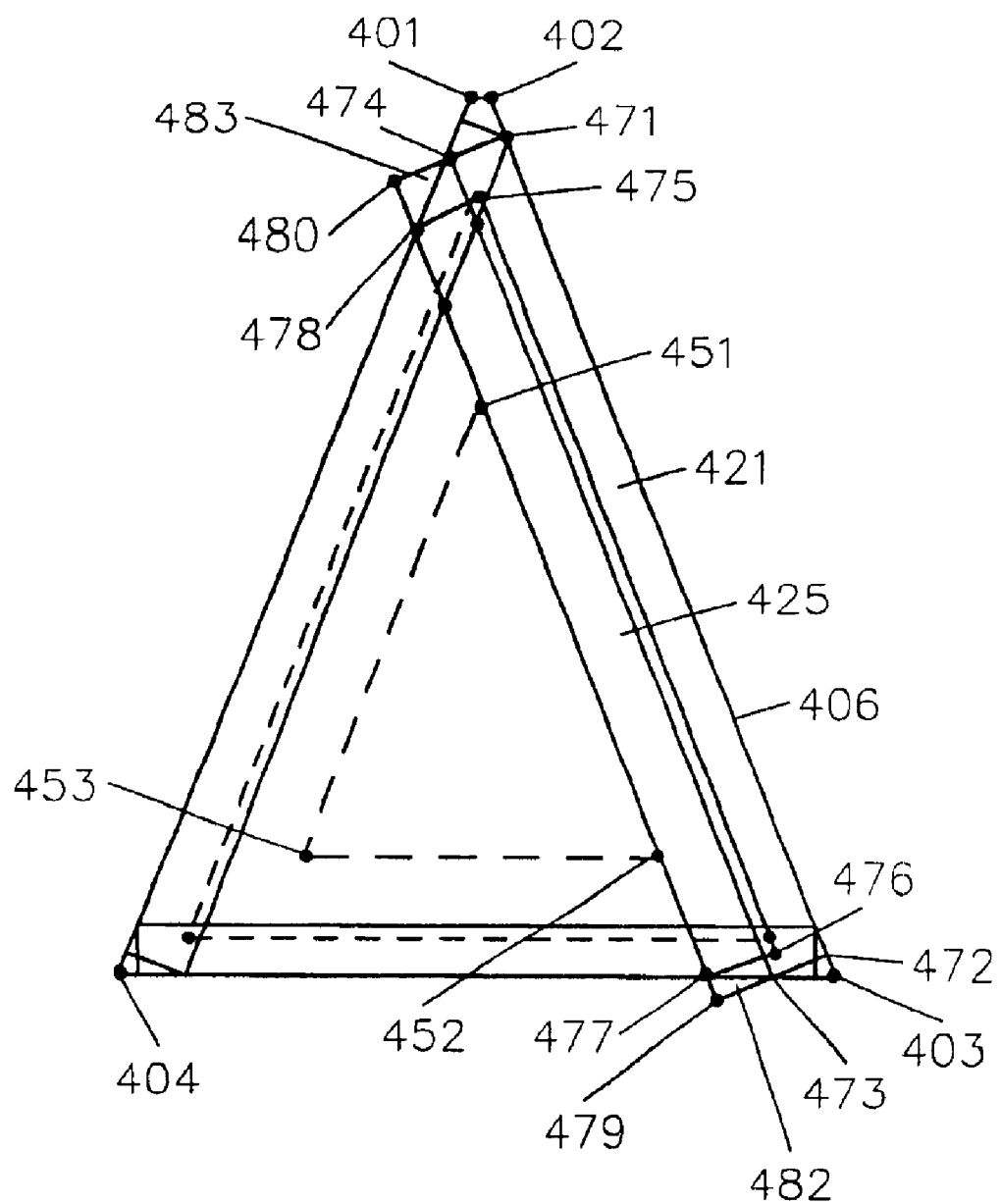
FIG. 10 illustrates problem areas resulting from merging border areas for the polygon illustrated in FIG. 8.

Referring to FIG. 10, problem areas 482 and 483 result from attempting to merge rectangles 421 and 425. Rectangle 421 is border segment defined by vertices 471–474, and rectangle 425 is a border segment defined by vertices 475–478. In order to merge these two segments 421 and 425, segment 425 would be extended to vertices 479 and 480 (so as to be equal in length to segment 421 between vertices 474 and 473). In so doing, portions 482 and 483 of the merged rectangles 421/425 extend beyond the original polygon 406, and are "problem areas" inhibiting merging under the method of the preferred embodiment of the invention. Acute angles are the root problem which typically prevents borders being merged, and this appears in several drawings as dark areas comprised of many, narrow lines (many, because they have not been merged into a few larger lines).

Figure 11:
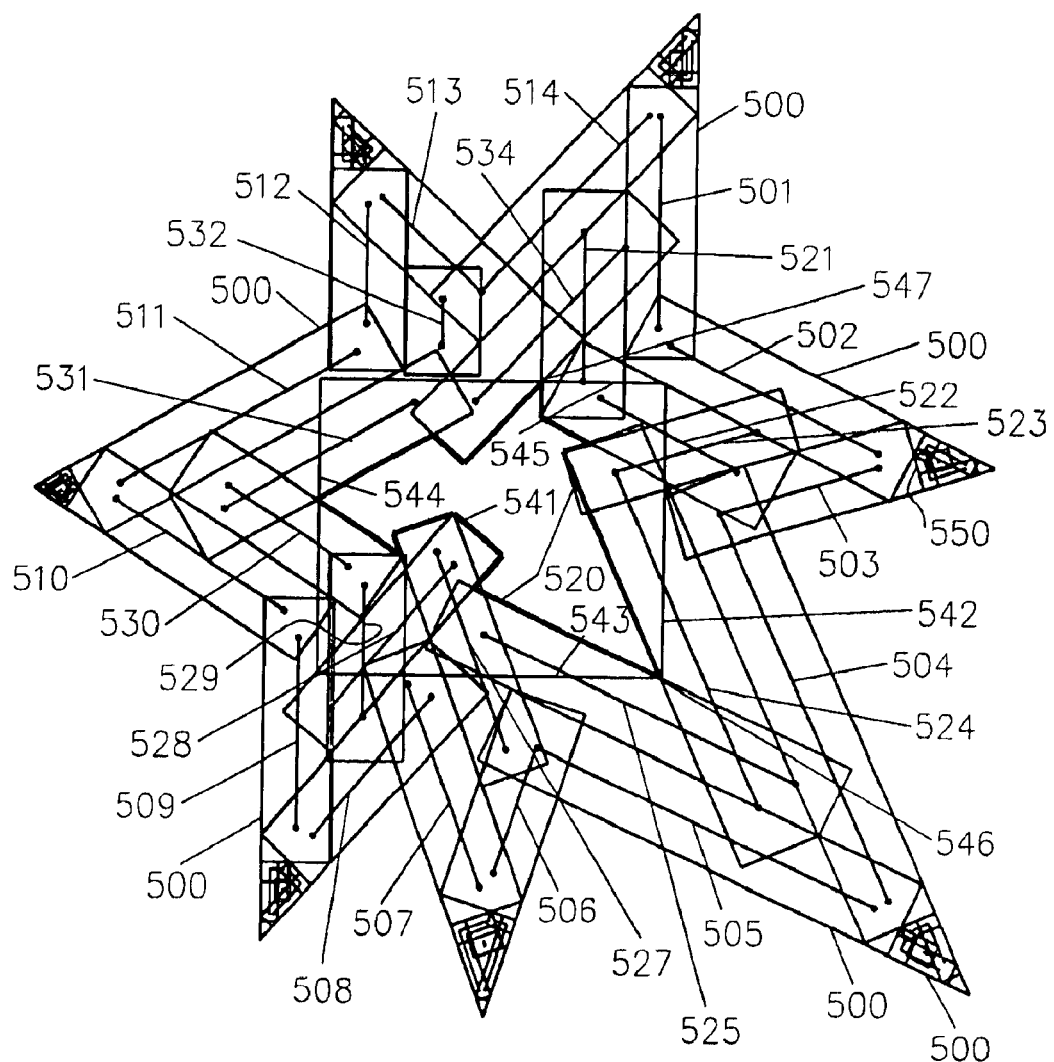
FIG. 11 illustrates an inner border, outer border, and least encompassing rectangle.

Referring to FIG. 11, an inner border is a series of rectangular shapes which parallel the original polygon envelope but whose edges do not overlay the original polygon envelope. In FIG. 11, inner border 520 is formed by rectangular shapes having center lines 521 through 534 which are parallel to but do not overlay the original polygon envelope 500.

An outer border is a series of rectangular shares with edges which touch the original polygon envelope. This is also illustrated in FIG. 11, where the outer border is formed by rectangular shapes including those having center lines 501 through 514 and, repeated in each acute angle, several rectangular shapes 550, all of which touch original polygon envelope 500.

Referring further to FIG. 11, a least encompassing rectangle (LER) is the smallest possible rectangle which will completely contain a given (polygon) shape. In FIG. 11, the LER represented by center line 541 and sides 542–545 completely contains the polygon shape formed by inner border 520, including points 546 and 547.

A new inner polygon is provided by shrinking an original polygon. A border is a line with one edge adjacent to a polygon perimeter. All non-orthogonal shapes have at least one border. A border line is created by shrinking the original shape by one-half of the amount used to calculate a new inner polygon. The vertices of the newly created polygon are then used to create line segments which are rectangular in shape. Shapes which are orthogonal can be filled with one or more orthogonal rectangles. The LER for a shape is the smallest possible rectangle which when drawn completely contains the original shape. If the LER is completely contained within the original polygon, then bordering is terminated and the inner polygon is filled using a single rectangle. When a series of border segments are created, often it is possible to merge adjacent border segments (also referred to as rectangles, flashes, lines or stripes). This reduces data volume and decreases artwork machine run time.

With complicated shapes such as those found on a typical substrate, the volume of fill data can be enormous. This causes problems saving, loading, and manipulating these designs. When data merging is enabled, dozens or even hundreds of shapes can be combined into a single shape, thus significantly minimizing data volume.

The polygon fill application of the invention is made artwork machine independent, or substantially so. Some artwork machines work by opening an aperture as wide as the required line width W. This aperture is then moved along the length AB of the line in order to expose the glass. Still other machines have variable size apertures which open up to expose an entire line segment in a single flash. Depending upon the type of machine, a border may need to be represented by a single line or a number of individual line segments. In addition to this parameter, the polygon fill application of the preferred embodiment of the invention provides the ability to specify wires-with-ends or wires-with-no-ends, the smallest possible flash size, the largest possible flash size, the flash overlap amount, and the maximum number of border lines.

Figure 12:
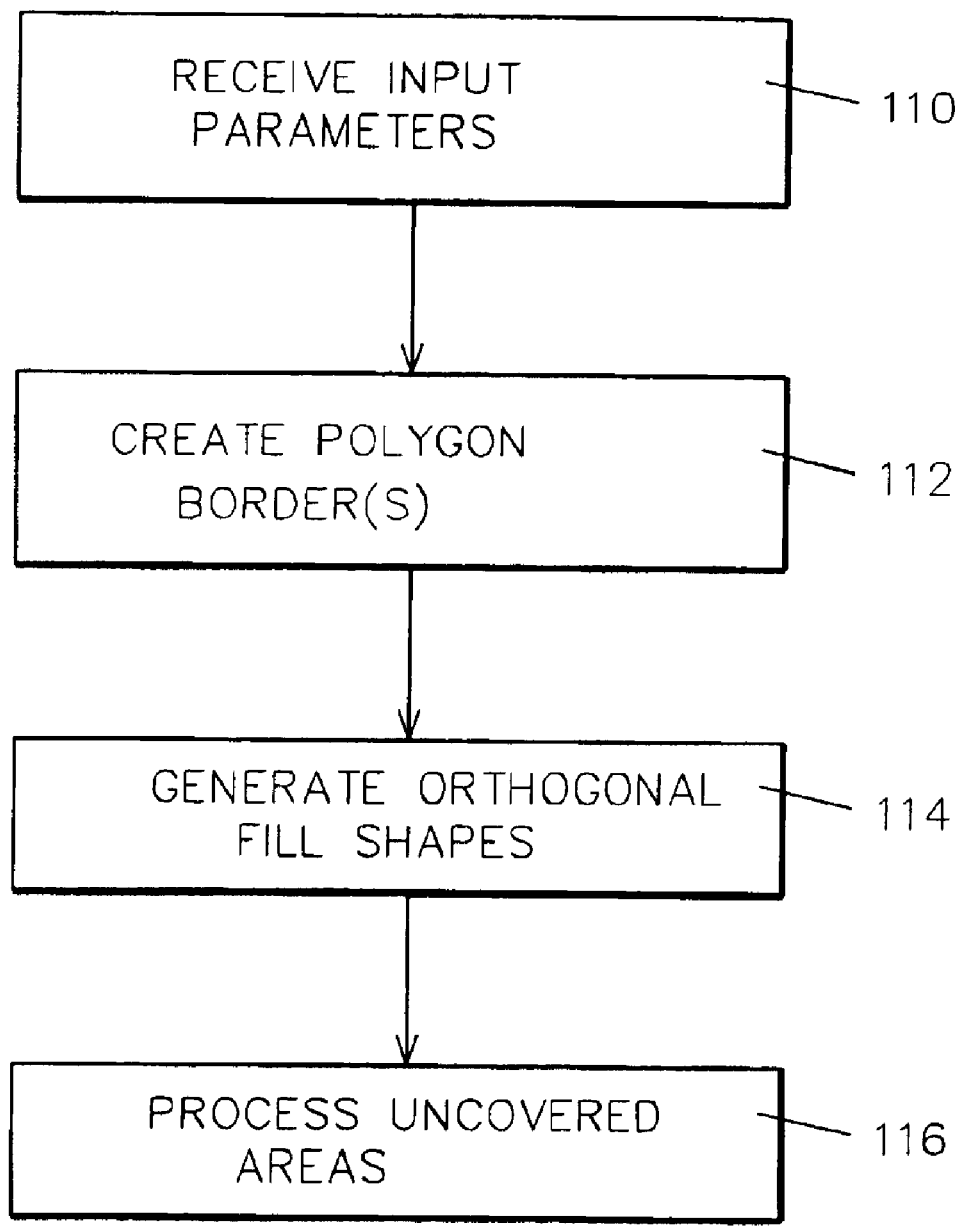
FIG. 12 is a high level flow chart of the method of the invention for filling a polygon.

Referring to FIG. 12, the polygon fill method of a preferred embodiment of the invention includes receive input parameters step 110, create polygon borders step 112, generate orthogonal fill shapes step 114, and process uncovered areas step 116. These steps will be more fully described hereafter in connection with FIGS. 13–17.

Referring to FIG. 13, the polygon fill input parameters received in step 110 include MinimumStripeWidth 120, MaximumStripeWidth 122, StripeOverlapAmount 124, Wire With Ends Size Delta 126, MaximumNumberofBorders 128, and MergeAdjacentBorders flag 130. These parameters have the meanings described below.

MinimumStripeWidth 120—All fill shapes must be at least this wide.

MaximumStripeWidth 122—All fill shapes may be no wider than this amount.

StripeOverlapAmount 124—Adjacent fill shapes must overlap by this amount.

Wire With Ends Size Delta 126—The Wire With Ends Size Delta parameter instructs the application on the minimum difference between a fill line's length and width and is ignored when generating wires-with-no-ends (wne).

MaximumNumberofBorders 128—The maximum number of border segments to be applied to the original polygon.

MergeAdjacentBorders flag 130—This is a Yes/No flag. When set to Yes, adjacent border segments will be merged where possible.

Figure 14:
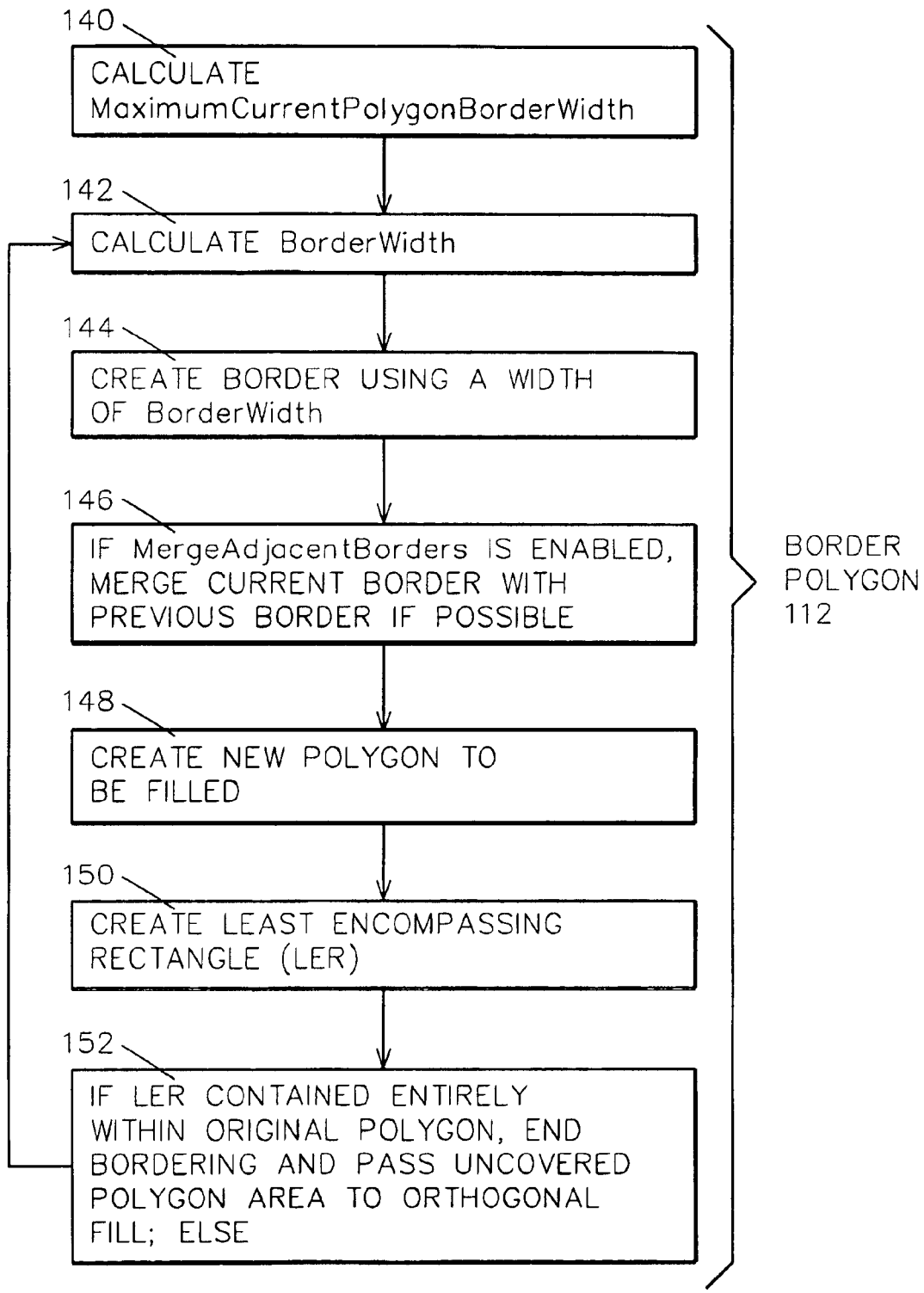
FIG. 14 is a flow chart illustrating the create polygon border(s) step 112 of FIG. 12.

Referring to FIG. 14 in connection with FIGS. 16 and 17, the create polygon borders step 112 of FIG. 12 will now be described. In step 112, an outer border is created along with zero or more inner borders. All border segments lie entirely within the original polygon envelope and the segments parallel the polygon sides. In FIG. 11, border segment with centerline 501 is an outer border, and the segment with centerline 521 is an inner border.

This step 112 is recursive in nature. Referring to FIG. 11, the first time it gets invoked it operates upon the original polygon 500 to potentially produce an outer border including outer border fill shapes 501–514. Assuming a StripeOverlapAmount=0, when these outer border fill shapes are subtracted from the original polygon 500, a new slightly smaller polygon is created. (In FIG. 11, this is represented by the inner most edges of fill shapes 501–514 which are parallel to and inward from the edges of original polygon 500.) This 'new' polygon is then passed to the border routine 112 and an inner border may get generated. The inner border segments, represented by segments 521 through 534 are then subtracted from the current polygon, and another 'new' polygon 520 is created. Close examination of the inner border segments depicted by centerlines 501–514 in FIG. 11 shows the absence of centerlines 526 and 533 which should have been adjacent to centerlines 506 and 513 respectively. These segments were in fact initially created but had to be dropped due to the fact that (1) wires-with-ends (wwe) were specified and (2) the segments were too short to be accurately described based upon the value of WiresWithEndsSizeDelta 126 specified. Should the dropping of such segments leave and uncovered "hole", process uncovered areas step 116 would have corrected the problem. Bordering step 112 terminates when one of the following conditions occurs:

1. The current polygon is orthogonal (all of its sides are orthogonal).
2. The Least Enclosing Rectangle for the current polygon lies entirely within the original polygon. In FIG. 11, this is the case. That is, LER 541, including edges 542–545, lies entirely within polygon 500.
3. The BorderWidth computed in step 142 is zero.
4. The current number of Borders exceeds MaximumNumberofBorders 128 as specified by the user. In FIG. 11, the number of borders is two. That is, two iterations through bordering step 112 have produced two series of border segments 501–514 and 521–534, respectively.

Referring to FIG. 14, bordering step 112 includes calculate MaximumCurrentPolygonBorderWidth step 140, calculate BorderWidth step 142, create border step 144, merge border step 146, create new polygon step 148, create least encompassing rectangle (LER) step 150, and switch to orthogonal fill step 152.

In Calculate MaximumCurrentPolygonBorderWidth step 140, the MaximumStripeWidth 122 input parameter is adjusted to a new, and perhaps lower, upper limit which reflects the characteristics of the current polygon as well as any previous border widths which may have preceded it.

Figure 16:
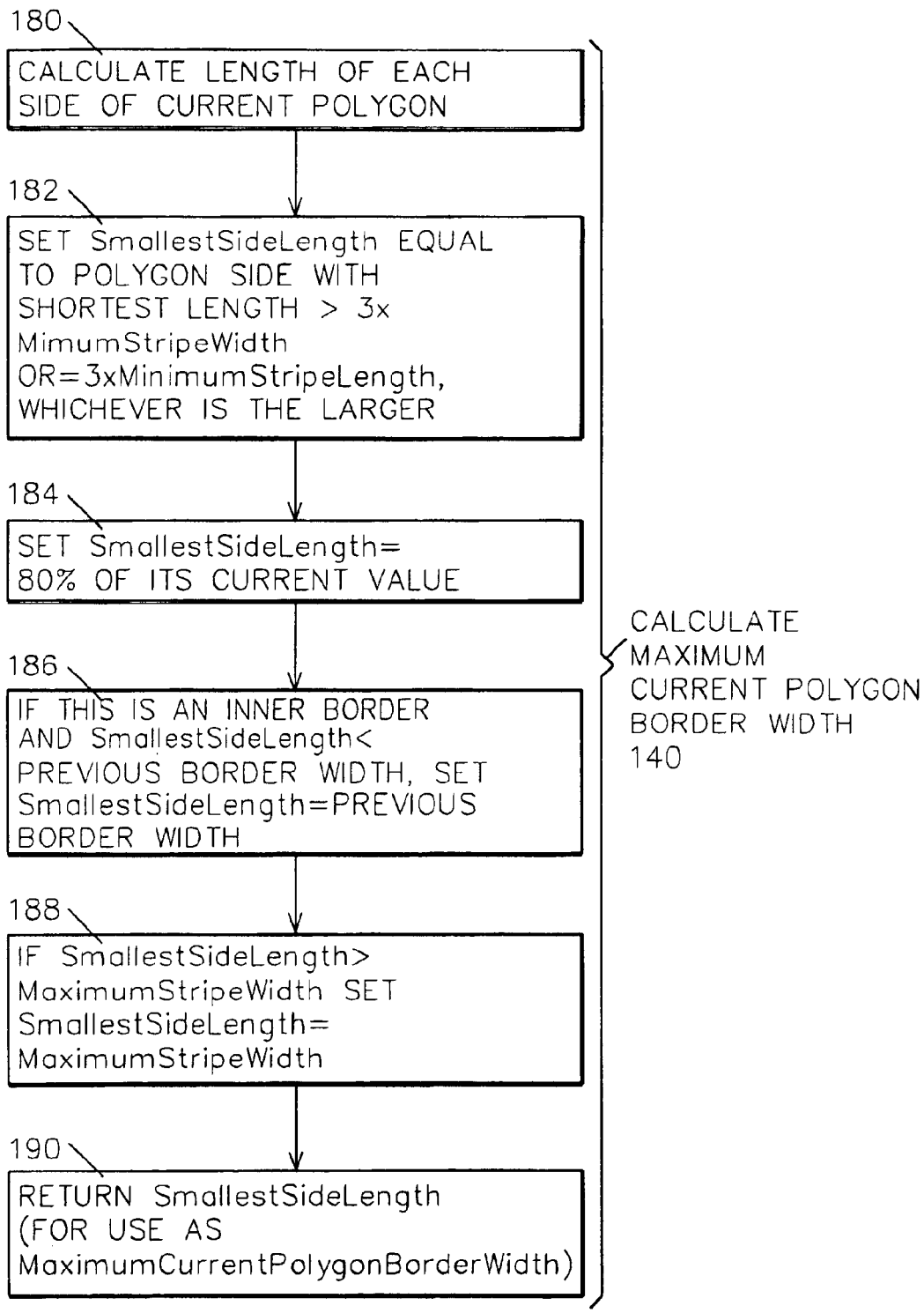
FIG. 16 is a flow chart illustrating the calculate MaximumCurrentPolygonBorderWidth step 140 of FIG. 14.

Referring to FIG. 16, this step 140 includes the following:

In step 180, the vertices of the current polygon are examined and used to calculate the length of each side. Referring to FIG. 4, vertices 401–404 define a current polygon, each pair of vertices 401/402, 402/403, 403/404 and 404/401 defining a side and their separation the length of that side.

In step 182, a SmallestSideLength parameter is derived, as follows: the polygon side with the shortest length is located; however, lengths which are less than or equal to three times the MinimumStripeWidth 120 are ignored; if no side is found which meets the this 3× criteria, the SmallestSideLength is set equal to three times MinimumStripeWidth. In FIG. 4, the side defined by vertices 401 and 402 is, let it be assumed, less than three times the MinimumStripeWidth 120, and will be ignored.

In step 184, the SmallestSideLength parameter of step 182 is set equal to some reduced amount, say 80%, of its current value.

In step 186, if this is an inner border and the SmallestSideLength is less than the previous border width, then the SmallestSideLength is set to the previous border width.

In step 188, if the SmallestSideLength is greater than the MaximumStripeWidth, then the SmallestSideLength is set equal to MaximumStripeWidth.

In step 190, the SmallestSideLength variable is returned, to be used in later processing as the MaximumCurrentPolygonBorderWidth.

Referring again to FIG. 14, in calculate BorderWidth step 142, based upon the current polygon to be bordered, the MinimumStripeWidth specified by the caller, and the MaximumCurrentPolygonBorderWidth computed in step 140, the BorderWidth which will actually be used is determined. The widest width which is 'reasonable' is chosen, since this will minimize the overall number of fill shapes. The method of FIG. 17 implements the logic for selecting a 'reasonable' border width. A BorderWidth of zero indicates that bordering should be halted due to the fact that the polygon is impossible to be bordered using the input parameters from step 110 or that bordering should be terminated in favor of orthogonal fill step 114.

Figure 17:
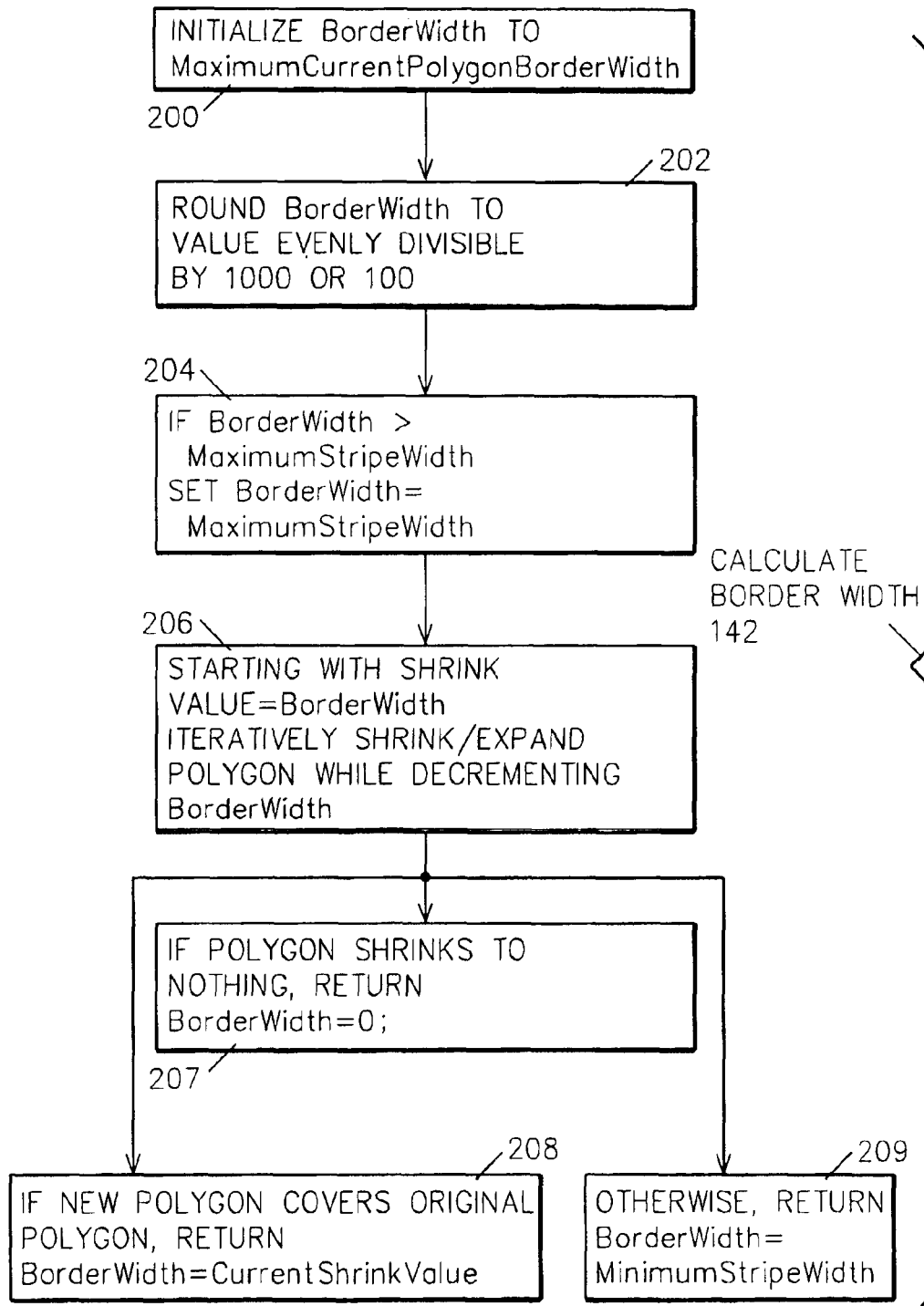
FIG. 17 is a flow chart illustrating the calculate BorderWidth step 142 of FIG. 14.

Referring to FIG. 17, this step 142 includes the following.

In step 200, Initialize BorderWidth equal to the MaximumCurrentPolygonBorderWidth from step 190.

In step 202, 'odd' border widths are avoided by rounding BorderWidth as follows: if BorderWidth>1000, then round BorderWidth to the nearest value evenly divisible by 1000; otherwise round BorderWidth to the nearest value evenly divisible by 100.

In step 204, if the rounding operation of step 202 caused BorderWidth to exceed MaximumStripeWidth 122, BorderWidth is set equal to MaximumStripeWidth 122.

In step 206, an iterative shrink/expand operation is performed on the polygon, starting with a shrink value equal to BorderWidth. This shrink/expand operation may be performed by a shape manipulation tool, an application which allows for manipulation of shapes. In this case, the shape tool is used to shrink a shape and then re-expand it by an identical amount. There are three possible outcomes:

1. The shrink operation causes the shape to shrink into 'nothing'.
2. The shrink/expand creates a polygon which completely covers the original, or previous, polygon.
3. The shrink/expand creates a polygon which does not completely cover the original polygon.

The reason for performing the shrink followed by an expand is to test a possible border width. A 'good' border width will create a polygon which is identical, or nearly identical, to the original.

The iteration loop step 206 starts using the BorderWidth calculated in step 204, decrementing it by 1000 while greater than 1000, and decrementing it by 100 when less than 100. Ideally, in step 208, the loop is terminated when a border is encountered with a width which completely covers the original polygon after a shrink/expand. In step 207, if the shrink operation causes the shape to shrink to 'nothing', a BorderWidth of zero (no solution) is returned. Otherwise, in step 209, MinimumStripeWidth is returned for use as BorderWidth in subsequent processing.

Referring again to FIG. 14, steps 144–152 are only executed if BorderWidth>0. A border width is a constant value for all edges of a current polygon. However, if MergeAdjacentBorders 130 is turned on, some border segments may get merged while other possibly may not.

In step 144, a border of width BorderWidth is created. If the selected BorderWidth is x, then the polygon is shrunk by x/2. Referring to FIG. 9, this newly created polygon is depicted by dashed lines 461–463. The end points of these lines 461–463 are used to create the border fill shape 421, 422, and 423.

In step 146, if MergeAdjacentBorders flag 130 is enabled, an attempt is made to merge the current border shape with the previous border. Referring to FIG. 10, each adjacent border segment pair 421, 425 is analyzed individually. If the previous segment 421 (identified by its similar slope and the fact that it touches the current segment 425) can be merged without the resultant shape falling outside the original polygon envelope, the merger is allowed. In FIG. 10, the resultant shape falls outside the original polygon envelope 406 at problem areas 482, 483, and merging is not permitted.

In step 148, a 'new' polygon to be filled is created. The new polygon is computed by shrinking the current polygon by an amount equal to BorderWidth minus the StripeOverlapAmount. Referring to FIG. 6, current polygon 406 is shrunk by an amount equivalent to the difference between 424 and 434, resulting in new polygon 408 defined by vertices 431–433.

In step 150, a Least Encompassing Rectangle (LER) is created for the new polygon of step 148.

Figure 22:
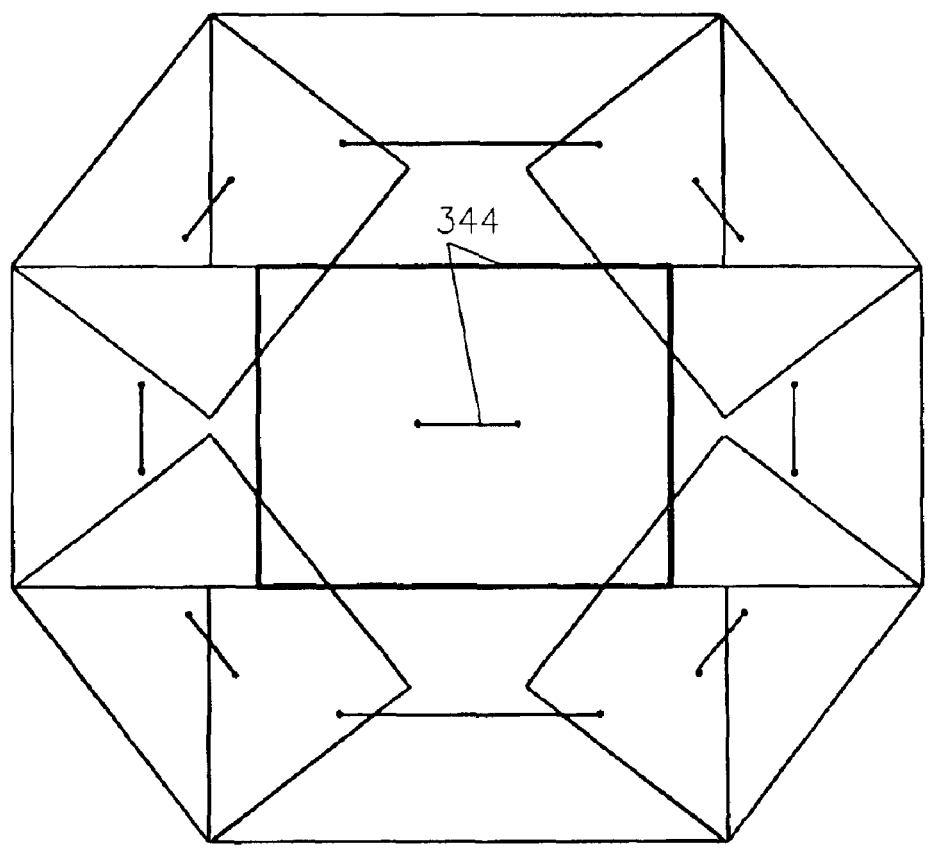
FIG. 22 illustrates an octagon, a typical shape where the polygon fill application may reach a point where it recognizes that the unfilled portion of the design can be filled with a single orthogonal rectangular shape.

In step 152, if the LER computed in step 150 is not contained entirely within the original polygon envelope, processing returns to step 142 to act upon the new polygon from step 148. Referring to FIG. 22, LER 344 is contained within the original polygon envelope. Referring to FIG. 7, LER 441 is not contained entirely within original polygon envelope 406, and processing returns to step 142 to act upon new polygon 408.

Figure 20:
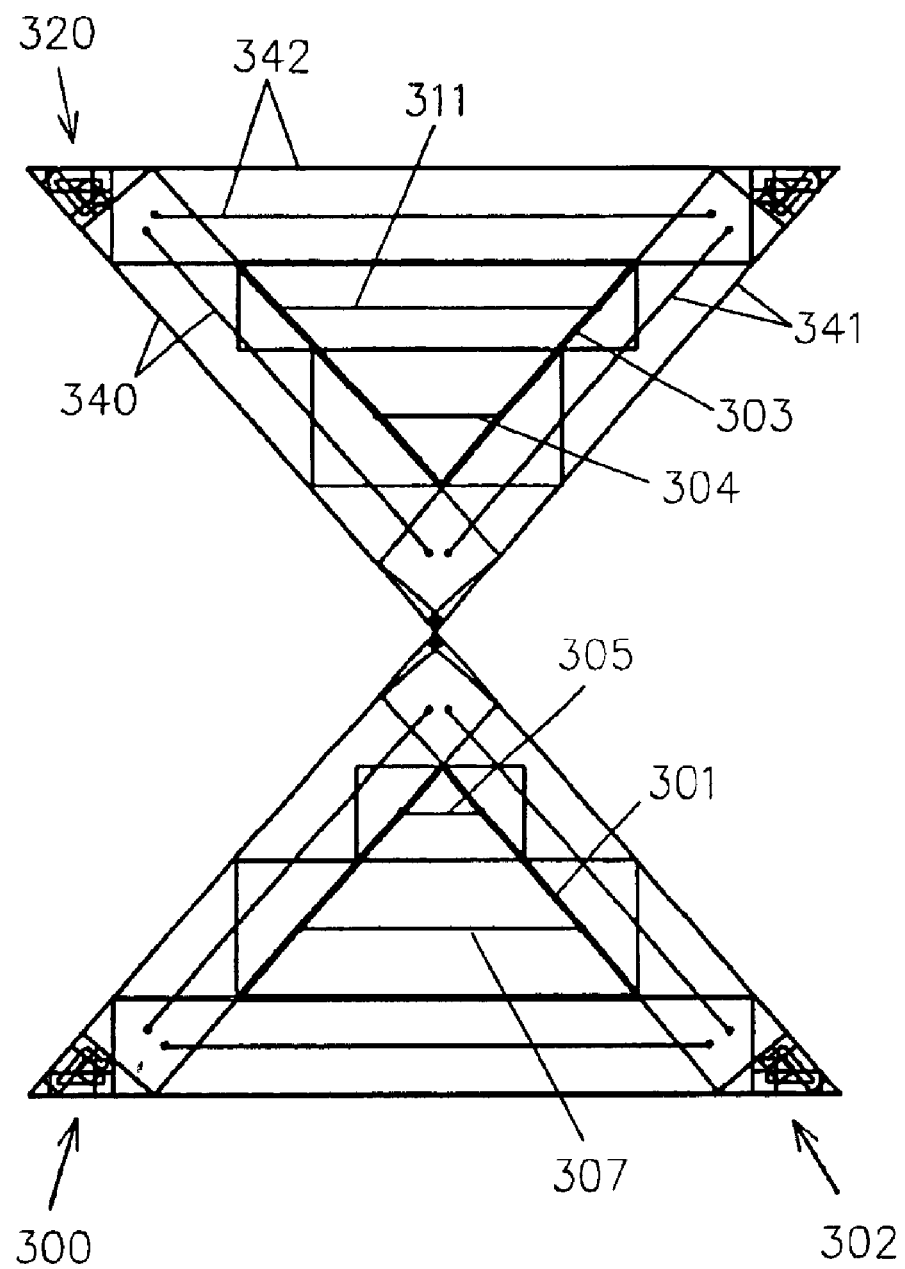
FIG. 20 shows an hour-glass shaped figure, demonstrating the initial selection of a rather wide paint stripe.

Bordering step 112 may cause a polygon to degenerate into multiple 'new' polygons, as is illustrated in FIG. 20. As this occurs, each new polygon must be treated individually. When bordering step 112 terminates for a specific polygon, it is the remaining uncovered polygon area which will be passed to orthogonal fill step 114. Referring to FIG. 20, the remaining uncovered polygon areas passed to orthogonal fill step 114 include areas 301 and 303.

Figure 15:
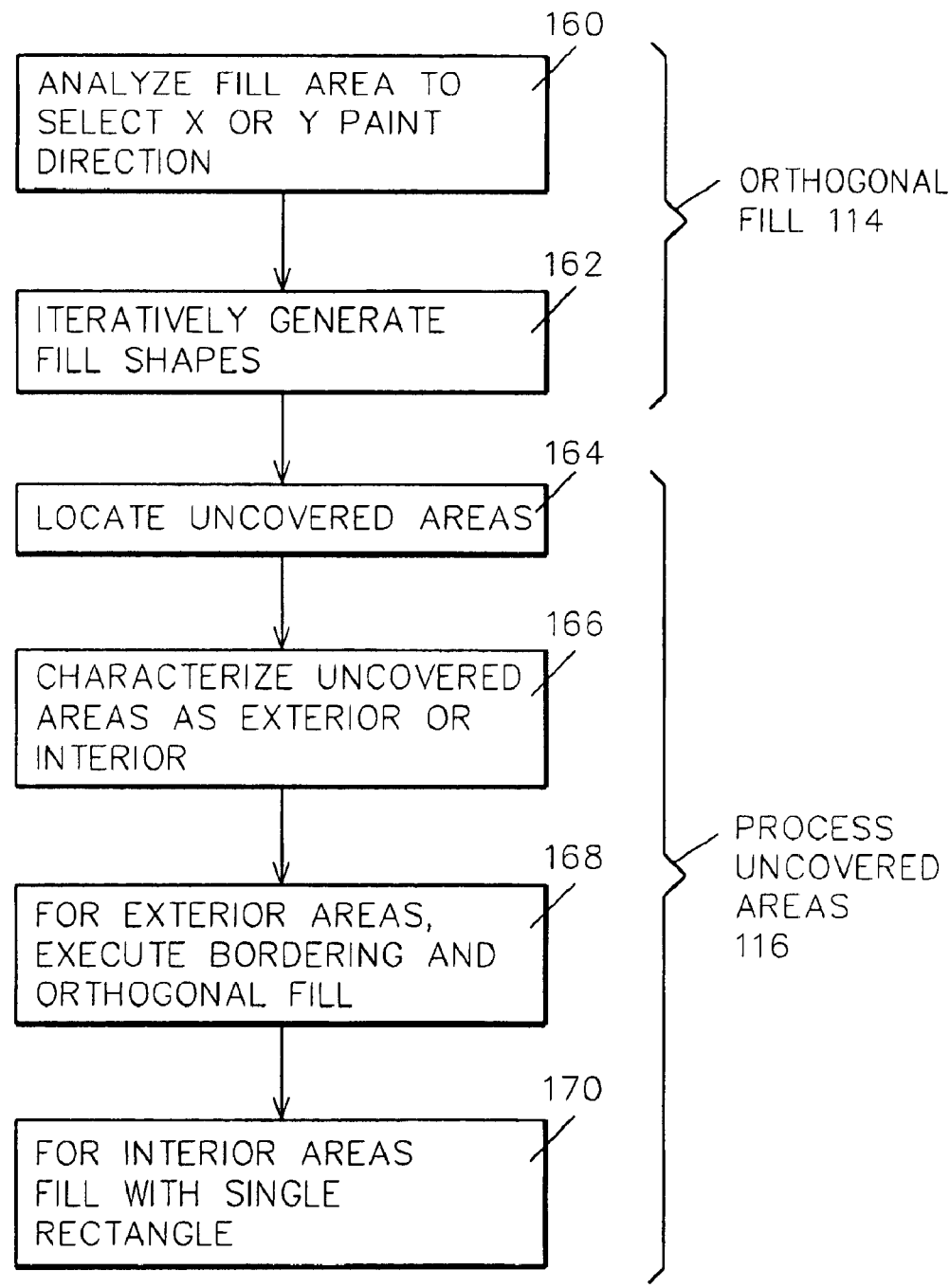
FIG. 15 is a flow chart illustrating the orthogonal fill step 114 and process uncovered areas step 116 of FIG. 12.

Referring to FIG. 15, orthogonal fill step 114 includes analyze step 160 and generate step 162. During orthogonal fill step 114, one or more orthogonal fill shapes will be generated to fill the interior of the original orthogonal polygon or the bordered non-orthogonal polygon. Referring to FIG. 20, areas 301 and 303 will be covered during orthogonal fill by rectangles represented by center lines 305/307 and 309/311, respectively.

In step 160, the area(s) to be filled are analyzed. Whether the fill shapes should be 'painted' in the x or y direction is determined. If the uncovered polygon is wider than it is tall, it is more efficient to cover the area with horizontal stripes.

In step 162, the proper number of fill shapes required to completely fill the uncovered area are iteratively generated. When painting stripes horizontally, processing starts at the lowest y value required and proceeds with increasing y values. When painting vertically, processing starts at the lowest x value.

All orthogonal fill stripes are initially generated using a width of MinimumStripeWidth. A check is then made to see if the current fill shape can be merged with the previous orthogonal fill shape. If so, merging occurs. Orthogonal shapes are always merged, regardless of the value of the MergeAdjacentBorders flag, which applies only to border fill shapes.

Figure 19:
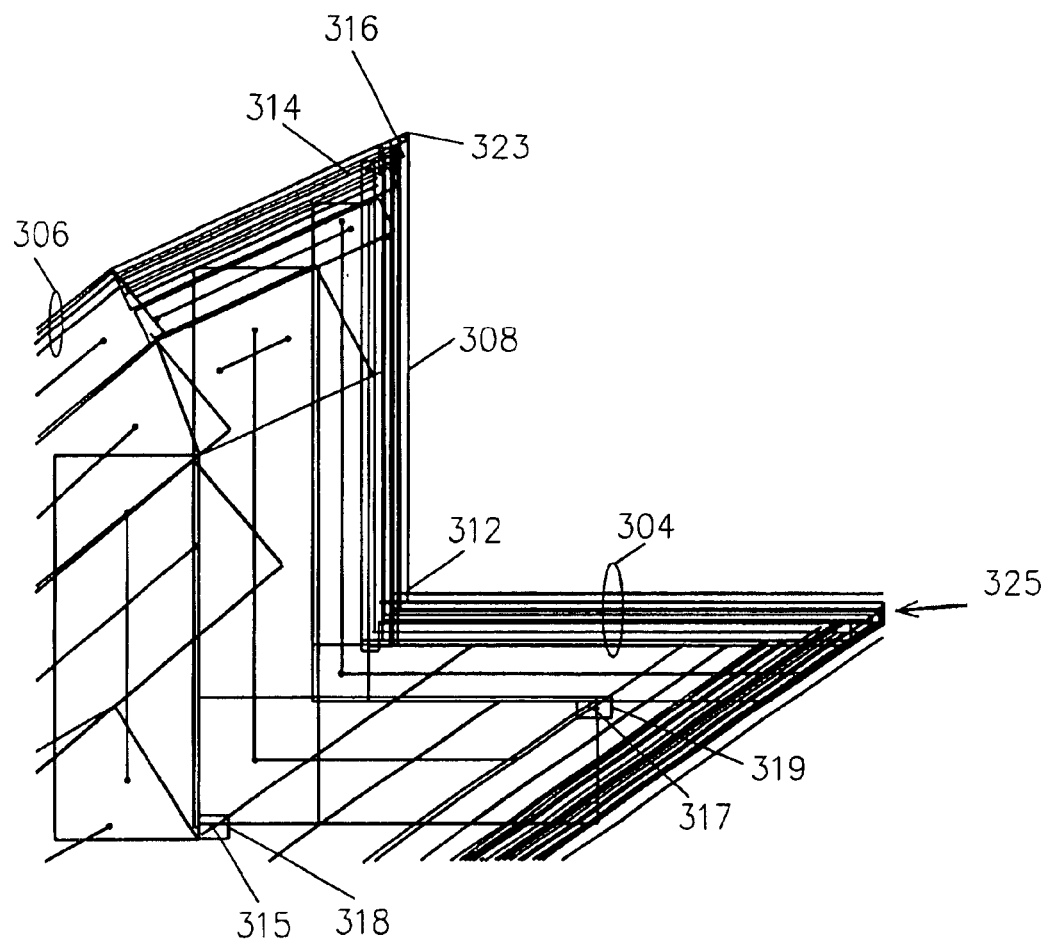
FIG. 19 is a zoom-in on the acute angles at the upper right of FIG. 18.

Referring further to FIG. 15, process uncovered areas step 116 includes locate step 164, characterize step 166, execute step 168 and fill step 170. Step 116 is required because uncovered areas may result during normal polygon fill due to:

1. Acute angles at polygon vertices—The larger the initial BorderWidth selected, the larger these uncovered areas will be. However, even if the narrowest possible BorderWidth is used (i.e. MinimumStripeWidth), there will still be some uncovered area. Referring to FIG. 20, areas 300 and 302 are examples of uncovered areas at acute angles.
2. Small areas in the interior of the polygon (which also occur as a result of acute angles). In the example of FIG. 19, two such interior 'holes' 315, 317 are filled by small rectangles 318, 319, respectively.

In step 164, all uncovered areas are located. These are located by unioning all of the existing fill shapes together. This union result is then subtracted from the original polygon envelope. The resulting difference is expressed as a series of zero or more polygons of unfilled area.

In step 166, each of the unfilled polygons is examined iteratively to determine if the current polygon lies in the interior of the original polygon or in it's exterior (i.e. along the polygon envelope). If the current polygon is an exterior polygon, step 112 is invoked to border the unfilled area or shape and step 114 to fill its interior orthogonally. If the current polygon is an interior polygon, the interior uncovered area, or void, is filled with a single rectangle.

Referring again to FIG. 2, a rectangle 210 representing a wire-with-end (wwe) is illustrated. This is also referred to as a line. In the graphical tool used in FIGS. 18–21 for demonstrating polygon fill process ng, the center line of a line is shown, together with its endpoints and envelope. A wire envelop extends beyond line 210 ends a and b by one-half the width (w) of the wire envelop.

Referring to FIGS. 18–24, various aspects of polygon filling are illustrated.

In bordering step 112, it is determined how wide the border should be along the edges of the polygon. That border is painted along the polygon perimeter, and the original polygon shrunk by the width of the border minus StripeOverlapAmount 124. During bordering, border segment merging may occur. This is illustrated in FIG. 19, and described hereafter.

In orthogonal fill step 114, fill lines are provided on the horizontal or vertical axis. Step 112 exits to orthogonal fill as soon as it is determined that the remaining area can be filled with orthogonal fill lines, or fill stripes. This is illustrated in FIGS. 20 and 22, and described hereafter.

In process uncovered areas step 116, uncovered areas are identified and filled in using narrow lines. In step 112, a "good" border size was selected. If the border is wide, the efficient painting or filling occurs, but acute angles are left uncovered. If the border is narrow, a large number of paint stripes is required, and many of these cannot be merged due to the narrow angle. Consequently, optimal processing occurs in the presence of acute angles by starting with wide stripes and then filling the uncovered areas with narrow stripes. Optimal processing occurs when the number of stripes, or rectangles, required to fill an area is as small as reasonably possible. Because the glass expose machine may have some error, one of the input parameters accepted is StripeOverlapAmount 124, and overlap of adjacent stripes is permitted unless the resulting rectangle extends beyond the envelop of the original polygon.

Figure 18:
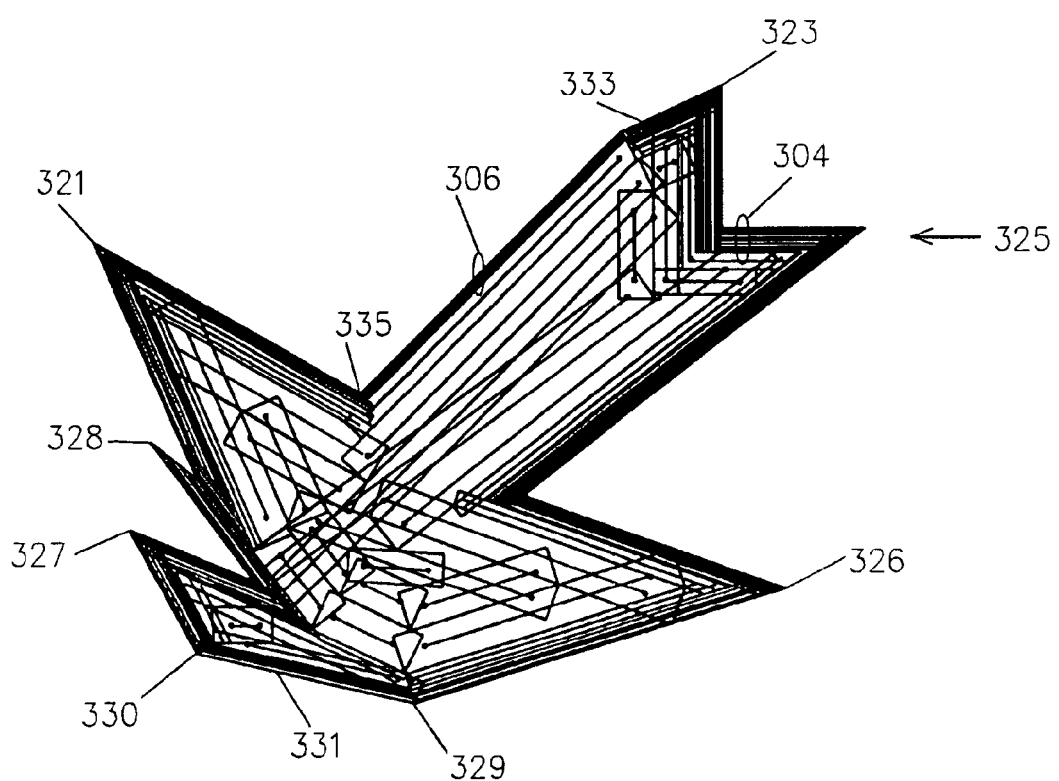
FIG. 18 illustrates a single polygon shape containing pin point acute angles and provides an overview of the capabilities of the polygon fill application of the preferred embodiment of the invention.

Referring to FIG. 18, a single polygon shape illustrates an overview of the capabilities of the polygon fill application. The calculate border width step 140 produced a fairly narrow border stripe as can be seen at each of the acute angle vertices 321–328 of this polygon. Border merging was enabled during data generation for this polygon as evidenced by polygon side 331 which spans between obtuse angles 329 and 330, and by polygon side 306 which spans between the obtuse angle at vertex 333 and vertex 335. Here the wide border stripes are created by merging numerous narrow stripes into a few wide stripes. Stripes entering and exiting acute angles are also tested to see if they can be merged, but in most cases merging is inhibited.

FIG. 19 is a zoom-in on the two different acute angles 323 and 325 at the upper right of FIG. 18, which illustrates that the more narrow the angle, the more that border merging is inhibited. That is, because acute angle 325 is narrower than acute angle 323, border merging is inhibited to a greater degree at polygon side 304 than at side 308, resulting in side 304 having more border segments than side 308.

FIG. 19, like FIG. 10, also illustrates conditions under which border segment merging can and cannot occur. A polygon edge 308 extends between two vertices 323, 312. With each border 314, it is determined if this border 314 lies alongside an adjacent border 316. If it does, and merging of borders 314 and 316 will not result in a border which falls outside of the original polygon, then merging occurs. FIG. 19 shows a situation where merging occurs and a situation where merging cannot occur. If merging is allowed, the merge happens and a wider stripe results. If merging is inhibited, then narrow stripes result. The result illustrated in FIG. 19 is wide stripes at side 306 and narrow stripes at side 308, and still more narrow stripes at side 304.

FIG. 20 shows an hour-glass shaped figure. During polygon fill a rather wide paint stripe is initially selected. This large paint stripe generates a small number of fill shapes 340, 341, 342 to cover the majority of the upper portion of the hour-glass shape.

Figure 21:
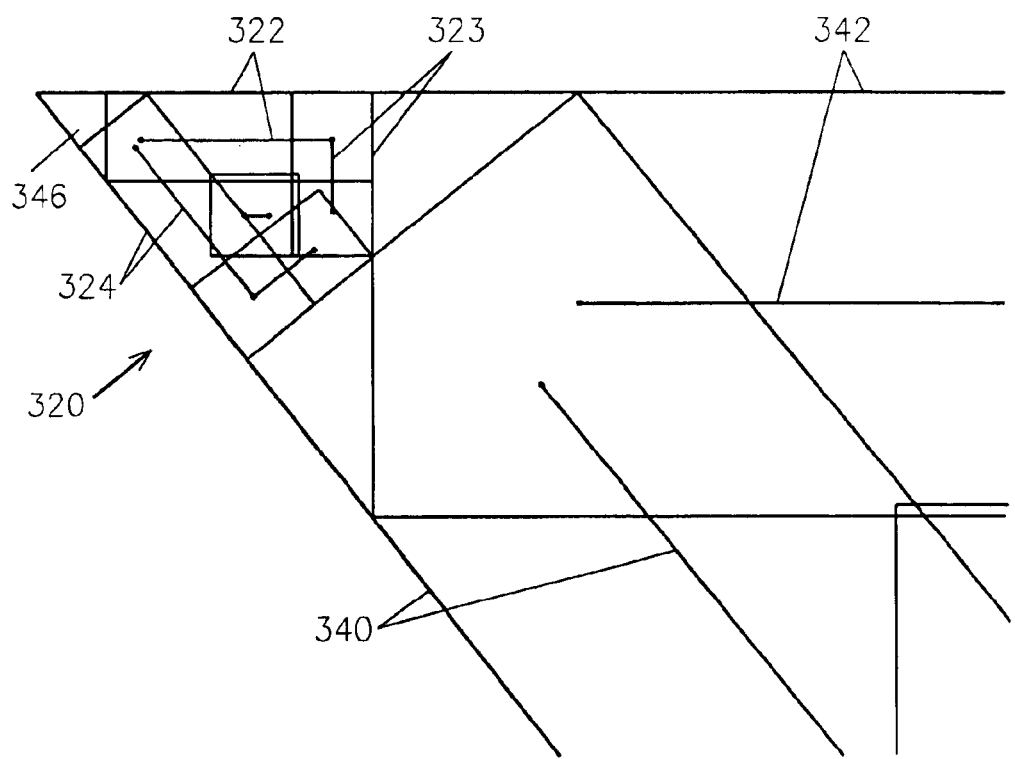
FIG. 21 is a zoom-in of the upper left corner of the hour-glass of FIG. 20, demonstrating the selection of smaller stripe widths for covering acute angles.

FIG. 21 is a zoom-in of the upper left corner of the hour-glass of FIG. 20. Here the large paint stripes 340, 342 were unable to project into the acute angle 320. This uncovered real estate 320 is then covered with a much smaller, albeit, less efficient stripe width 322, 323 and 324. There may be uncovered areas 346 at the very tip of an acute angle which cannot be covered. One of the input parameters is MinimumStripeWidth 120, which represents the narrowest flash that the glass expose machine can produce. That MinimumStripeWidth 120 is selected for the line widths of rectangles 322, 323 and 324 being positioned as closely as possible into the tips of acute angles.

FIG. 22 illustrates an octagon. For many artwork machines, orthogonal fill shapes are more efficient than nonorthogonal shapes. In the FIG. 22 the polygon fill application reaches a point where it recognizes that the unfilled portion of the design could be filled with a single orthogonal rectangular shape 344, which is what it then uses to fill the center of the shape.

Figure 23:
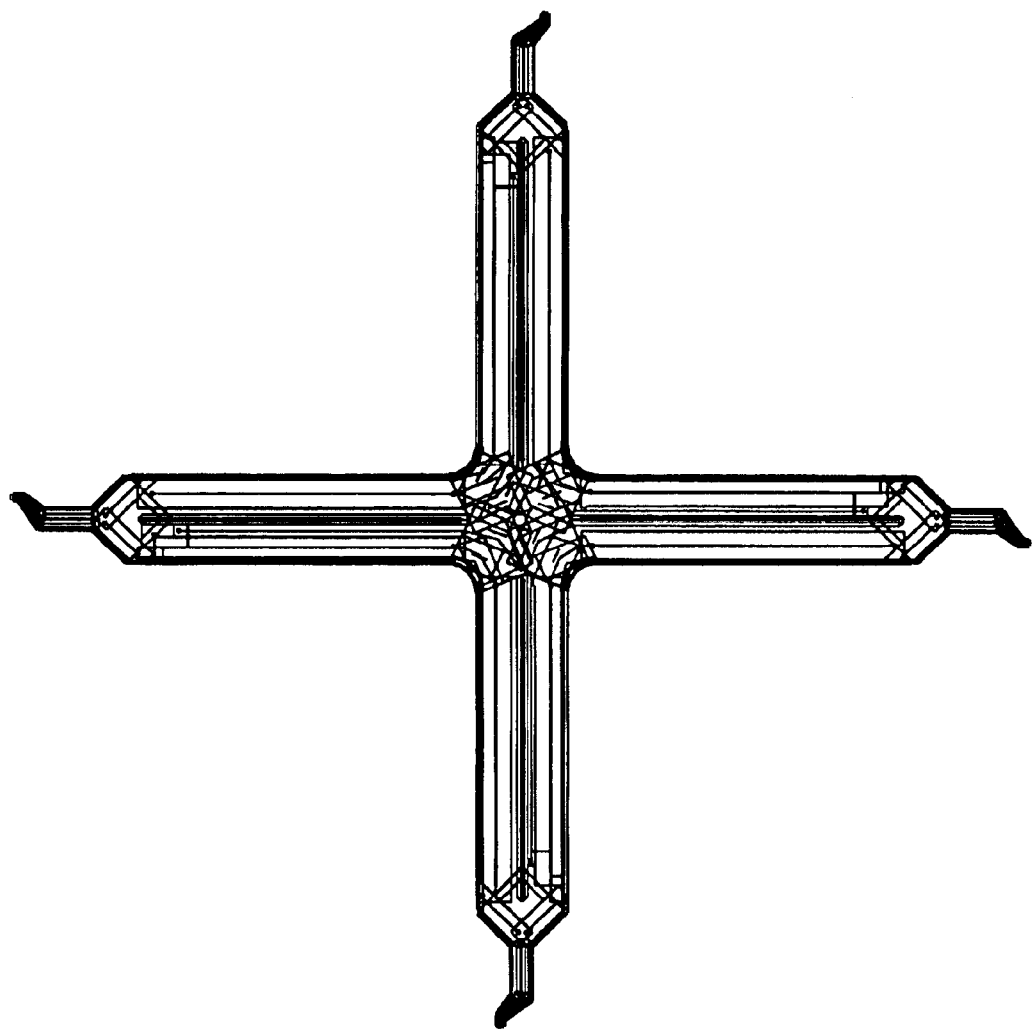
FIG. 23 is an example of a shape from a substrate design. These shapes can be quite complex requiring a large number of fill shapes.

FIG. 23 is an example of a shape from a substrate design. These shapes can be quite complex requiring a large volume of fill shapes.

Figure 24:
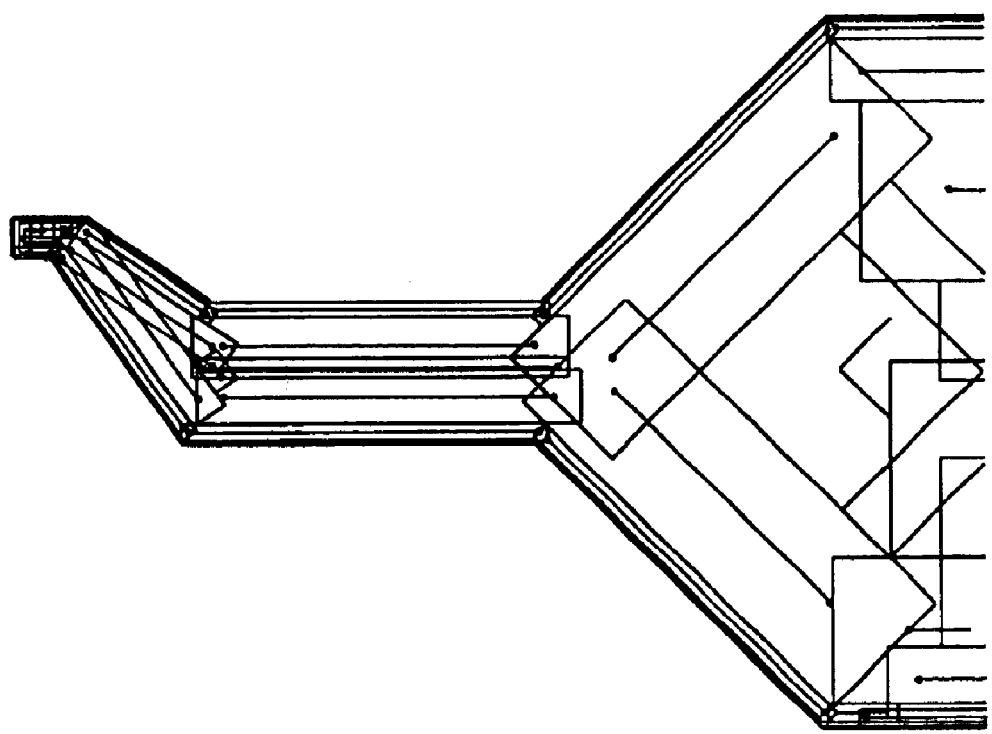
FIG. 24 is a zoom-in of the left side of the shape of FIG. 23.

FIG. 24 is a zoom-in of the left side of the original shape of FIG. 23.

ADVANTAGES OVER THE PRIOR ART

It is an advantage of the invention that there is provided an improved system and method for polygon fill.

It is a further advantage of the invention that there is provided a polygon fill application which is workstation based.

It is a further advantage of the invention that there is provided a workstation based polygon fill application which is capable of accepting user supplied parameters including fill rectangle tolerances, rectangle overlap amounts, and maximum number of borders so that all polygon fill rectangles conform to the selected artwork generator's machine tolerances and limitations.

It is a further advantage of the invention that there is provided a system and method for producing a minimal quantity of rectangles to fill a polygon, thereby reducing artwork generator run time.

It is a further advantage of the invention that there is provided a system and method utilizing a shapes analysis and manipulation tool to perform all required shape analysis and manipulation.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for filling a polygon with a minimum number of rectangles, comprising:
    bordering said polygon, including:
        calculating a maximum current polygon border width including adjusting a maximum stripe width input parameter to a new upper limit which reflects characteristics of a current polygon as well as any previous border polygons by
            calculating the length of each side of said current polygon;
            deriving a smallest side length parameter equal to the larger of (1) a first factor times said minimum stripe width or (2) the length of the shortest side obtained from said calculating length;
            setting said smallest side length parameter from said deriving to a reduced amount by a second factor;
            if said current polygon is an inner border and said smallest side length parameter is less than the previous border width, setting said smallest side length equal to said previous border width;
            if said smallest side length parameter is greater than said maximum stripe width parameter, setting said smallest side length parameter equal to said maximum strip width parameter; and
            returning said smallest side length parameter for processing as said maximum current polygon border width parameter;
    merging border segments where possible; and then orthogonally filling.

2. A method for filling an original polygon envelope with a minimum number of stripes, comprising:
    creating a border polygon including a plurality of border segments; including:
        calculating a maximum current polygon border width parameter for a current polygon;
        responsive to said maximum current polygon border width parameter, calculating a border width parameter for a current border;
        creating a border polygon with a width equal to said border width parameter;
        responsive to a merge adjacent borders flag being enabled, creating a new border including merging said current border with a previous border if possible;
        responsive to said new border from said merging, creating a new fill polygon;
        creating a least encompassing rectangle for said new fill polygon; and
        responsive to said least encompassing rectangle being contained entirely within said original polygon envelope, ending said creating a border polygon and passing any uncovered area within said new fill polygon to said generating; otherwise, returning to said calculating width to process said new fill polygon as said current polygon;
    merging border segments where possible; and thereafter switching to generating orthogonal fill stripes; and
    processing uncovered areas.

3. The method of claim 2, further comprising:
    receiving input parameters, said input parameters including parameters defining a minimum stripe width, a maximum stripe width, and a merge adjacent borders flag.

4. The method of claim 2, said input parameters further including stripe overlap amount.

5. The method of claim 3, said input parameters further including wire with ends size delta, and maximum number of borders.

6. The method of claim 2, said calculating a maximum current polygon border width further comprising:
    adjusting said maximum stripe width input parameter to a new upper limit which reflects characteristics of said current polygon as well as any previous border polygons.

7. The method of claim 6, said adjusting further comprising:

calculating the length of each side of said current polygon;

deriving a smallest side length parameter equal to the larger of (1) a first factor times said minimum stripe width or (2) the length of the shortest side obtained from said calculating length;

setting said smallest side length parameter from said deriving to a reduced amount by a second factor;

if said current polygon is an inner border and said smallest side length parameter is less than the previous border width, setting said smallest side length equal to said previous border width;

if said smallest side length parameter is greater than said maximum stripe width parameter, setting said smallest side length parameter equal to said maximum strip width parameter; and returning said smallest side length parameter for processing as said maximum current polygon border width parameter.

8. The method of claim 7, said calculating a border width for a current border further comprising:

responsive to said minimum stripe width parameter and said maximum current polygon border width parameter, deriving a border width variable selectively operable for determining that said current polygon is impossible to be bordered or that said generating orthogonal fill stripe be executed.

9. The method of claim 8, said deriving a border width variable further comprising:

initializing said border width variable equal to said maximum current polygon border width parameter;

rounding said border width variable;

if said border width variable exceeds said maximum stripe width parameter, setting said border width variable equal to said maximum stripe width parameter;

iteratively shrinking and expanding said current polygon with a shrink value equal to said border width variable;

if said shrinking causes said current polygon to shrink to nothing, then indicating a solution is not possible;

if said shrinking and expanding create a new polygon which completely covers said current polygon, then terminating said iteratively shrinking and expanding and returning said border width variable for use in subsequent processing; and if said shrinking and expanding create a polygon which does not cover said current polygon, then returning said minimum strip width parameter for use as said border width variable in subsequent processing.

10. The method of claim 2, said generating orthogonal fill stripes, further comprising:

analyzing areas to be filled to determine optimal stripe direction; and iteratively generating fill stripes in said optimal stripe direction to fill said areas to be filled.

11. The method of claim 2, said processing uncovered areas further comprising:

locating all uncovered polygon areas by subtracting the union of all existing fill shapes from said original polygon envelope; and iteratively process each said uncovered polygon area, selectively bordering and orthogonally filling those uncovered polygon areas which are exterior polygons, and filling with a single rectangle uncovered polygon areas which are interior polygons.

12. The method of claim 7, said first factor being 3 and said second factor being 0.8.

13. An artwork generating system, comprising:

an exposure tool for exposing a glass master to a polygon envelop as a plurality of polygon fill stripes;

a polygon fill control module defining an optimum set of said polygon fill stripes for filling said polygon envelope, said control module being operable for generating a first plurality of fill stripes comprising a plurality of border polygons including:

calculating a maximum current polygon border width parameter for a current polygon;

responsive to said maximum current polygon border width parameter, calculating a border width parameter for a current border;

creating a border polygon with a width equal to said border width parameter;

responsive to a merge adjacent borders flag being enabled, creating a new border including merging said current border polygon with a previous border polygon if possible;

responsive to said new border polygon from said merging, creating a new fill polygon;

creating a least encompassing rectangle for said new fill polygon; and responsive to said least encompassing rectangle being contained entirely within said original polygon envelope, ending said creating a border polygon and returning any uncovered area within said new fill polygon; otherwise, returning to said calculating width to process said new fill polygon as said current polygon;

generating zero to a plurality of orthogonal fill stripes; and generating zero to a plurality of fill stripes for processing uncovered areas.

14. A method for filling an original polygon envelope with a minimum number of stripes, comprising:

generating a first plurality of stripes for creating a border polygon, including:

calculating a maximum current polygon border width parameter for a current polygon;

responsive to said maximum current polygon border width parameter, calculating a border width parameter for a current border;

creating a border polygon with a width equal to said border width parameter;

responsive to a merge adjacent borders flag being enabled, creating a new border including merging said current border polygon with a previous border polygon if possible;

responsive to said new border polygon from said merging, creating a new fill polygon;

creating a least encompassing rectangle for said new fill polygon; and responsive to said least encompassing rectangle being contained entirely within said original polygon envelope, ending said creating a border polygon and returning any uncovered area within said new fill polygon; otherwise, returning to said calculating width to process said new fill polygon as said current polygon;

generating a second plurality zero or more stripes comprising orthogonal fill stripes; and generating a third plurality of zero or more stripes for processing uncovered areas.

15. A system for filling an original polygon envelope with a minimum number of stripes, comprising:
- means for generating a first plurality of stripes for creating a border polygon, including:
  - calculating a maximum current polygon border width parameter for a current polygon;
  - responsive to said maximum current polygon border width parameter, calculating a border width parameter for a current border;
  - creating a border polygon with a width equal to said border width parameter;
  - responsive to a merge adjacent borders flag being enabled, creating a new border including merging said current border polygon with a previous border polygon if possible;
  - responsive to said new border polygon from said merging, creating a new fill polygon;
  - creating a least encompassing rectangle for said new fill polygon; and
- responsive to said least encompassing rectangle being contained entirely within said original polygon envelope, ending said creating a border polygon and returning any uncovered area within said new fill polygon; otherwise, returning to said calculating width to process said new fill polygon as said current polygon;
- means for generating a second plurality of zero or more stripes comprising orthogonal fill stripes; and
- means for generating a third plurality of zero or more stripes for processing uncovered areas.

16. A program storage device readable by a machine, tangibly embodying a program of instructions executable by a machine to perform a method for filling an original polygon envelope with a minimum number of stripes, said method comprising:
- generating a first plurality of stripes for creating a border polygon, including:
  - calculating a maximum current polygon border width parameter for a current polygon;
  - responsive to said maximum current polygon border width parameter, calculating a border width parameter for a current border;
  - creating a border polygon with a width equal to said border width parameter;
  - responsive to a merge adjacent borders flag being enabled, creating a new border including merging said current border polygon with a previous border polygon if possible;
  - responsive to said new border polygon from said merging, creating a new fill polygon;
  - creating a least encompassing rectangle for said new fill polygon; and
  - responsive to said least encompassing rectangle being contained entirely within said original polygon envelope, ending said creating a border polygon and returning any uncovered area within said new fill polygon; otherwise, returning to said calculating width to process said new fill polygon as said current polygon;
- generating a second plurality of zero or more stripes comprising orthogonal fill stripes; and
- generating a third plurality of zero or more stripes for processing uncovered areas.

17. An article of manufacture comprising:
- a computer useable medium having computer readable program code means embodied therein for filling an original polygon envelope with a minimum number of stripes, the computer readable program means in said article of manufacture comprising:
- computer readable program code means for causing a computer to effect generating a first plurality of stripes for creating a border polygon, including:
  - calculating a maximum current polygon border width parameter for a current polygon;
  - responsive to said maximum current polygon border width parameter, calculating a border width parameter for a current border;
  - creating a border polygon with a width equal to said border width parameter;
  - responsive to a merge adjacent borders flag being enabled, creating a new border including merging said current border polygon with a previous border polygon if possible;
  - responsive to said new border polygon from said merging, creating a new fill polygon;
  - creating a least encompassing rectangle for said new fill polygon; and
  - responsive to said least encompassing rectangle being contained entirely within said original polygon envelope, ending said creating a border polygon and returning any uncovered area within said new fill polygon; otherwise, returning to said calculating width to process said new fill polygon as said current polygon;
- computer readable program code means for causing a computer to effect generating a second plurality of zero or more stripes comprising orthogonal fill stripes; and
- computer readable program code means for causing a computer to effect generating a third plurality of zero or more stripes for processing uncovered areas.

18. A computer program product or computer program element for filling an original polygon envelope with a minimum number of stripes, according to a method comprising:
- generating a first plurality of stripes for creating at least one border polygon, including:
  - calculating a maximum current polygon border width parameter for a current polygon;
  - responsive to said maximum current polygon border width parameter, calculating a border width parameter for a current border;
  - creating a border polygon with a width equal to said border width parameter;
  - responsive to a merge adjacent borders flag being enabled, creating a new border including merging said current border polygon with a previous border polygon if possible;
  - responsive to said new border polygon from said merging, creating a new fill polygon;
  - creating a least encompassing rectangle for said new fill polygon; and
  - responsive to said least encompassing rectangle being contained entirely within said original polygon envelope, ending said creating a border polygon and returning any uncovered area within said new fill polygon; otherwise, returning to said calculating width to process said new fill polygon as said current polygon;
- generating a second plurality of zero or more stripes comprising orthogonal fill stripes; and
- generating a third plurality of zero or more stripes for processing uncovered areas.

19. A program storage device readable by a machine, tangibly embodying a program of instructions executable by a machine to perform a method for filling an original polygon envelope with a minimum number of stripes, said method comprising:
  receiving input parameters, said input parameters including parameters defining a minimum stripe width, a maximum stripe width, and a merge adjacent borders flag;
  first generating a first plurality of stripes for creating at least one border polygon;
  second generating a second plurality of zero or more stripes comprising orthogonal fill stripes; and
  third generating a third plurality of zero or more stripes for processing uncovered areas;
  said first generating including:
    calculating a maximum current polygon border width parameter for a current polygon;
    responsive to said maximum current polygon border width parameter, calculating a border width parameter for a current border;
    creating a border polygon with a width equal to said border width parameter;
    responsive to said merge adjacent borders flag being enabled, creating a new border including merging said current border with a previous border if possible;
    responsive to said new border from said merging, creating a new fill polygon;
    creating a least encompassing rectangle for said new fill polygon; and
    responsive to said least encompassing rectangle being contained entirely within said original polygon envelope, bending said creating a border polygon and passing any uncovered area within said new fill polygon to said generating a second plurality of zero or more stripes comprising orthogonal fill stripes; otherwise, returning to said calculating width to process said new fill polygon as said current polygon.

20. A method for filling an original polygon envelope with a minimum number of stripes comprising:
  receiving means for receiving input parameters, said input parameters including parameters defining a minimum stripe width, a maximum stripe width, and a merge adjacent borders flag;
  first generating means for generating a first plurality of stripes for creating at least one border polygon, including:
    calculating a maximum current polygon border width parameter for a current polygon;
    responsive to said maximum current polygon border width parameter, calculating a border width parameter for a current border;
    creating a border polygon with a width equal to said border width parameter;
    responsive to a merge adjacent borders flag being enabled, creating a new border including merging said current border polygon with a previous border polygon if possible;
    responsive to said new border polygon from said merging, creating a new fill polygon;
    creating a least encompassing rectangle for said new fill polygon; and
    responsive to said least encompassing rectangle being contained entirely within said original polygon envelope, ending said creating a border polygon and returning any uncovered area within said new fill polygon; otherwise, returning to said calculating width to process said new fill polygon as said current polygon;
  second generating means for generating a second plurality of zero or more stripes comprising orthogonal fill stripes; and
  third generating means for generating a third plurality of zero or more stripes for processing uncovered areas.

21. A method for filling an original polygon envelope with a minimum number of stripes, comprising of:
  creating a border polygon;
  generating orthogonal fill stripes;
  processing uncovered areas;
  receiving input parameters, said input parameters including parameters defining a minimum stripe width, a maximum stripe width, and a merge adjacent borders flag;
  said creating a border polygon further comprising:
    calculating a maximum current polygon border width parameter for a current polygon;
    responsive to said maximum current polygon border width parameter, calculating a border width parameter for a current border;
    creating a border polygon with a width equal to said border width parameter;
    responsive to said merge adjacent borders flag being enabled, creating a new border including merging said current border with a previous border if possible;
    responsive to said new border from said merging, creating a new fill polygon;
    creating a least encompassing rectangle for said new fill polygon;
    responsive to said least encompassing rectangle being contained entirely within said original polygon envelope, ending said creating a border polygon and passing any uncovered area within said new fill polygon to said generating; otherwise, returning to said calculating width to process said new fill polygon as said current polygon;
  said calculating a maximum current polygon border width including adjusting said maximum stripe width input parameter to a new upper limit which reflects characteristics of said current polygon as well as any previous border polygons by
    calculating the length of each side of said current polygon;
    deriving a smallest side length parameter equal to the larger of (1) a first factor times said minimum stripe width or (2) the length of the shortest side obtained from said calculating length;
    setting said smallest side length parameter from said deriving to a reduced amount by a second factor;
    if said current polygon is an inner border and said smallest side length parameter is less than the previous border width, setting said smallest side length equal to said previous border width;
    if said smallest side length parameter is greater than said maximum stripe width parameter, setting said smallest side length parameter equal to said maximum strip width parameter; and
    returning said smallest side length parameter for processing as said maximum current polygon border width parameter.

22. The method of claim 21, said calculating a border width for a current border further comprising:

responsive to said minimum stripe width parameter and said maximum current polygon border width parameter, deriving a border width variable selectively operable for determining that said current polygon is impossible to be bordered or that said generating orthogonal fill stripe be executed.

23. The method of claim 22, said deriving a border width variable further comprising:

initializing said border width variable equal to said maximum current polygon border width parameter;

rounding said border width variable;

if said border width variable exceeds said maximum stripe width parameter, setting said border width variable equal to said maximum stripe width parameter;

iteratively shrinking and expanding said current polygon with a shrink value equal to said border width variable;

if said shrinking causes said current polygon to shrink to nothing, then indicating a solution is not possible;

if said shrinking and said expanding create a new polygon which completely covers said current polygon, then terminating said iteratively shrinking and expanding and returning said border width variable for use in subsequent processing; and if said shrinking and expanding create a polygon which does not cover said-current polygon, then returning said minimum strip width parameter for use as said border width variable in subsequent processing.

24. The method of claim 21, said first factor being 3 and said second factor being 0.8.

25. A method for filling an original polygon envelope with a minimum number of stripes, comprising:

creating a border polygon;

generating orthogonal fill stripes;

processing uncovered areas;

receiving input parameters, said input parameters including parameters defining a minimum stripe width, a maximum stripe width, and a merge adjacent borders flag; and said creating a border polygon further comprising:

calculating a maximum current polygon border width parameter for a current polygon;

responsive to said maximum current polygon border width parameter, calculating a border width parameter for a current border;

creating a border polygon with a width equal to said border width parameter;

responsive to said merge adjacent borders flag being enabled, creating a new border including merging said current border with a previous border if possible;

responsive to said new border from said merging, creating a new fill polygon;

creating a least encompassing rectangle for said new fill polygon; and responsive to said least encompassing rectangle being contained entirely within said original polygon envelope, ending said creating a border polygon and passing any uncovered area within said new fill polygon to said generating; otherwise, returning to said calculating width to process said new fill polygon as said current polygon.

26. The method of claim 25, said calculating a maximum current polygon border width further comprising:

adjusting said maximum stripe width input parameter to a new upper limit which reflects characteristics of said current polygon as well as any previous border polygons.

27. The method of claim 25, said generating orthogonal fill stripes, further comprising:

analyzing areas to be filled, to determine optimal stripe direction; and iteratively generating fill stripes in said optimal stripe direction to fill said areas to be filled.

28. The method of claim 25, said processing uncovered areas further comprising:

locating all uncovered polygon areas by subtracting the union of all existing fill shapes from said original polygon envelope; and iteratively process each said uncovered polygon area, selectively bordering and orthogonally filling those uncovered polygon areas which are exterior polygons, and filling with a single rectangle uncovered polygon areas which are interior polygons.

29. The method of claim 21, said first factor being 3 and said second factor being 0.8.

* * * * *